United States Patent
Tsutsui

(10) Patent No.: US 9,336,522 B2
(45) Date of Patent: May 10, 2016

(54) METHOD OF CONTROLLING A GAME MACHINE

(71) Applicant: Prism Solutions Inc., Henderson, NV (US)

(72) Inventor: Yuichiro Tsutsui, Henderson, NV (US)

(73) Assignee: PRISM SOLUTIONS INC., Henderson, NV (US)

( * ) Notice: Subject to any disclaimer, the term of this patent is extended or adjusted under 35 U.S.C. 154(b) by 0 days.

(21) Appl. No.: 14/332,537

(22) Filed: Jul. 16, 2014

(65) Prior Publication Data

US 2016/0019540 A1    Jan. 21, 2016

(51) Int. Cl.
    G06Q 20/00    (2012.01)
    G06Q 20/38    (2012.01)
    G06Q 20/32    (2012.01)
    G06Q 20/40    (2012.01)

(52) U.S. Cl.
    CPC .......... *G06Q 20/3829* (2013.01); *G06Q 20/322* (2013.01); *G06Q 20/401* (2013.01); *G06Q 2220/00* (2013.01)

(58) Field of Classification Search
    USPC .......................................................... 705/71
    See application file for complete search history.

(56) References Cited

U.S. PATENT DOCUMENTS

| | | | |
|---|---|---|---|
| 5,851,149 A * | 12/1998 | Xidos et al. ................. | 463/42 |
| 2008/0076572 A1* | 3/2008 | Nguyen et al. ............... | 463/42 |
| 2008/0234047 A1* | 9/2008 | Nguyen ........................ | 463/42 |
| 2008/0268959 A1* | 10/2008 | Bryson et al. ................. | 463/42 |
| 2011/0065490 A1* | 3/2011 | Lutnick ................. | G07F 17/32 463/16 |
| 2013/0237310 A1* | 9/2013 | LeMay et al. ................. | 463/25 |

FOREIGN PATENT DOCUMENTS

JP    2002315946 A    10/2002

OTHER PUBLICATIONS

English language abstract of JP 2002-315946A obtained from Patent Abstracts of Japan.

* cited by examiner

*Primary Examiner* — John Hayes
*Assistant Examiner* — John M Winter
(74) *Attorney, Agent, or Firm* — Basil M. Angelo

(57) ABSTRACT

A server transmits an encryption key or encryption key information for specifying the encryption key to a mobile terminal. The mobile terminal acquires play money at the game machine, generates encrypted information by encrypting an ID token with the received encryption key or an encryption key corresponding to the received encryption key information, and transmits the ID token and the encrypted information to the server through the game machine. The server decodes the encrypted information, transacts a payment based on a user ID identifying a user of the mobile terminal and the amount of play money when the ID token received by the server matches the ID token acquired by the decoding, and authorizes the game machine to let the user play up to the amount of play money. Therefore, the game can be started by exchanging electronic data between the mobile terminal and the game machine with high security.

21 Claims, 22 Drawing Sheets transmission completed.

Wait a second please..........

FIG. 20

METHOD OF CONTROLLING A GAME MACHINE

BACKGROUND OF THE INVENTION

The present disclosure relates to a transaction method and a transaction system. Systems that let a user start a game in an amusement arcade such as a casino by exchanging electronic data between a user's mobile terminal and a game machine installed in the amusement arcade are known. For example, Japanese Unexamined Patent Application Publication No. 2002-315946 discloses an apparatus which receives a money value data balance from a mobile terminal and lends game mediums corresponding to the money value data balance.

Because casinos are commonly built in a space without windows in a building, radio waves of mobile phone networks are less likely to be received in the building. Further, because there are many game machines and mobile terminals capable of connecting to Wi-Fi channels in a casino, the Wi-Fi channels are crowded. Therefore, it is difficult for a mobile terminal in the casino to communicate with a server by using wireless communication channels. When a player tries to start playing a game in such a poor wireless communication environment, there are cases where the mobile terminal cannot connect with the server. In such a case, the possibility that the player will give up playing the game is high. If the player gives up playing the game, a casino misses out on earning profits. Therefore, it is necessary to minimize the possibility that the casino misses out on the profits, while also maintaining security.

In this situation, it is effective for a mobile terminal to exchange electronic data with the server through a game machine which can communicate with the server. It is effective to use a short distance wireless communication technology such as the Bluetooth Low Energy (BLE) and the Near Field Communication (NFC) for communication between the mobile terminal and the game machine to prevent interference with other mobile terminals.

However, a third person may intercept the electronic data when the electronic data is exchanged between a user's mobile terminal and the game machine using the short distance wireless communication such as BLE. Therefore, high security is required for exchanging the electronic data.

Further, because many game machines are installed in the amusement arcade, the mobile terminal can communicate with a plurality of game machines at the same time. For this reason, it is necessary that the mobile terminal correctly communicates with the game machine with which the user wants to play so that the user can reliably start playing a game with the game machine.

BRIEF SUMMARY OF THE INVENTION

The present disclosure is created in view of the aforementioned circumstances, and the present disclosure is to provide a transaction method and a transaction system for the game to be started by exchanging electronic data between the mobile terminal and the game machine with high security.

In the first aspect of the present disclosure, a method for paying money with a game system including a mobile terminal, a game machine capable of performing short distance wireless communication with the mobile terminal, and a server capable of performing communication with the mobile terminal and the game machine, that contains transmitting login information to the server from the mobile terminal, transmitting an encryption key or encryption key information for specifying the encryption key from the server to the mobile terminal when authentication based on the login information succeeds in the server, acquiring an amount of play money used to play at the game machine, generating encrypted information by encrypting first predetermined information with the received encryption key or the encryption key corresponding to the received encryption key information in the mobile terminal, transmitting the first predetermined information and the encrypted information to the server through the game machine, decoding the encrypted information, transacting a payment based on user identification information for identifying a user of the mobile terminal and the amount of play money when the first predetermined information received by the server matches with the first predetermined information acquired by the decoding in the server, and authorizing the game machine to start play up to the amount of play money, is provided.

In the second aspect of the present disclosure, a system for paying money including a mobile terminal, a game machine capable of performing short distance wireless communication with the mobile terminal, and a server capable of performing communication with the mobile terminal and the game machine, wherein the mobile terminal or the game machine includes an accepting part, the mobile terminal includes a login information transmitting part configured to transmit login information to the server, an encryption key receiving part configured to receive an encryption key or encryption key information that specifies the encryption key from the server, an encrypting part configured to generate encrypted information by encrypting predetermined information with the received encryption key or the encryption key corresponding to the received encryption key information, and an identification information transmitting part configured to transmit the predetermined information and the encrypted information to the server from the mobile terminal through the game machine, and the server includes an encryption key transmitting part configured to transmit the encryption key or the encryption key information to the mobile terminal when authentication based on the login information received from the mobile terminal succeeds, a decoding part configured to decode the received encrypted information, a transaction part configured to transact a payment based on the user identification information for identifying the user of the mobile terminal and the amount of play money when the received predetermined information matches with the predetermined information acquired by the decoding, is provided.

BRIEF DESCRIPTION OF THE DRAWINGS

FIG. 20 shows an example of a transmission completion screen.

DETAILED DESCRIPTION OF THE INVENTION

Hereinafter, the present disclosure is described through embodiments of the present disclosure. The following embodiments do not limit the claimed inventions, and all of the combinations of the features that are described in the embodiments are not always essential for the means for solving the problems of the disclosure.

The First Exemplary Embodiment

A Configuration of a Transaction System

Figure 1:
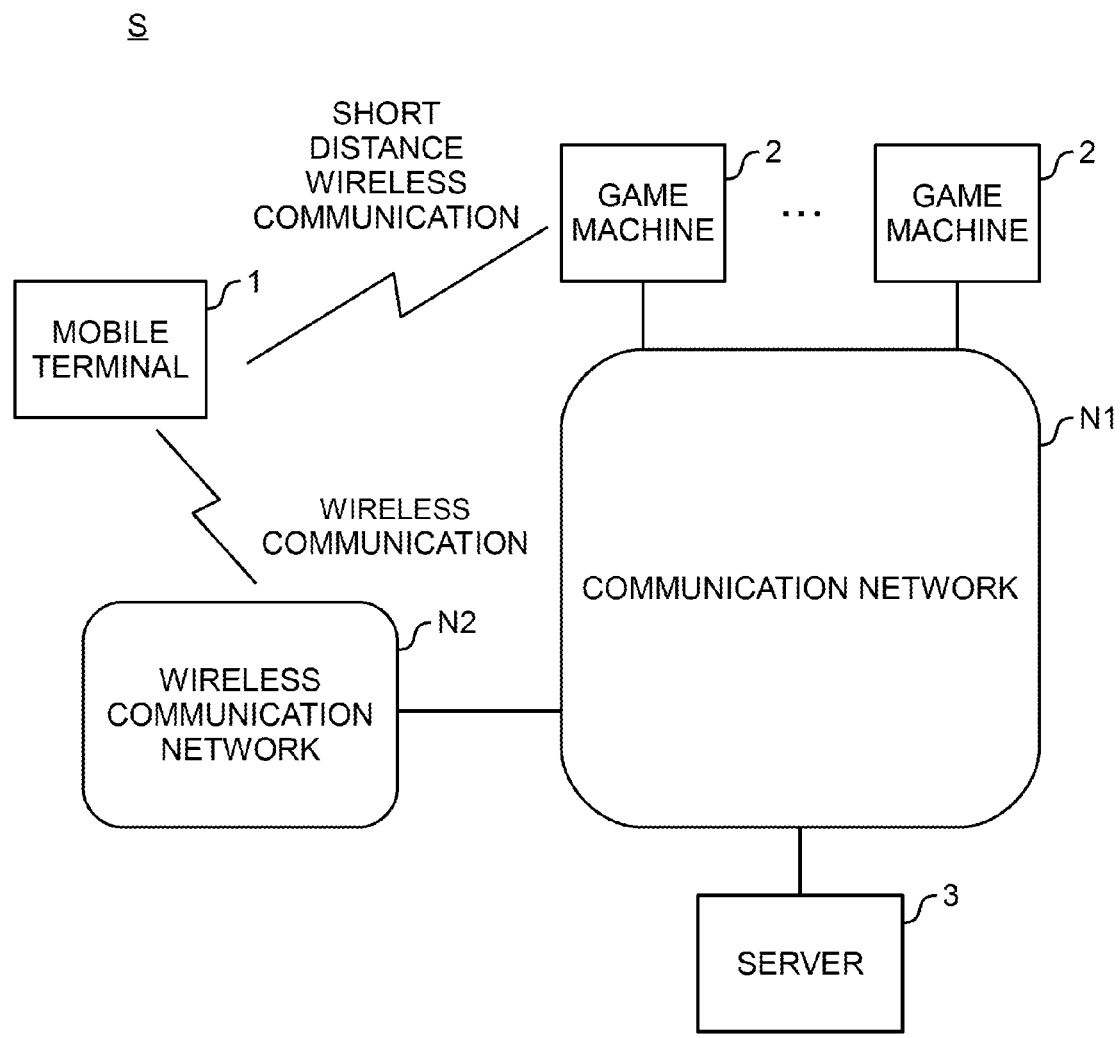
FIG. 1 shows a transaction system according to the first exemplary embodiment.

FIG. 1 shows a transaction system S according to the first exemplary embodiment. The transaction system S includes a mobile terminal 1, a plurality of game machines 2, and a server 3.

The mobile terminal 1 is, for example, a mobile phone such as a smartphone. The mobile terminal 1 can communicate with the server 3 through a communication network N1 such as a local area network (LAN), and a wireless communication network N2 such as a third-generation (3G) or fourth-generation (4G) mobile phone network and a Wi-Fi network. The mobile terminal 1 can communicate with a plurality of game machines 2 by using a short distance wireless communication technology such as the BLE.

A plurality of game machines 2 are installed in an amusement arcade such as a casino. Each of the plurality of game machines 2 provides at least one of a slot game, a table game such as a card game and a dice game, a sports book, and the like. Each of a plurality of game machines 2 can be connected to the mobile terminal 1 by the BLE, which is a short distance wireless communication channel. Each of the plurality of game machines 2 can communicate with the server 3 through the communication network N1. Each of the plurality of game machines 2 may communicate with the server 3 through the wireless communication network N2 and the communication network N1.

The server 3 manages a login status of the user of the mobile terminal 1 and controls payments and refunds of electronic money that the user possesses. The server 3 can communicate with the plurality of game machines 2 through the communication network N1, and can also communicate with the mobile terminal 1 through the communication network N1 and the wireless communication network N2.

The mobile terminal 1 stores a casino application to play a game at the game machine 2. The mobile terminal 1 runs the casino application and performs the short distance wireless communication with the game machine 2 so that the user can choose the game machine 2 with which the user wants to play.

Further, the mobile terminal 1 runs the casino application and communicates with the server 3 through the game machine 2 so that the user can electronically pay play money without inserting paper money into the game machine 2 and can electronically receive refunds of the play money without receiving paper money from the game machine 2. The mobile terminal 1 encrypts at least a part of information which is sent to the game machine 2 with an encryption key acquired from the server 3 to perform secure communication with the server 3 through the game machine 2.

Because casinos where the game machines 2 are installed are commonly built in a space without windows in a building, radio waves hardly reach the mobile terminal 1. Further, because there are many game machines 2 and mobile terminals 1 capable of connecting to the wireless communication network N2 in the casino, it is difficult for a mobile terminal 1 in the casino to communicate with the server 3 through the wireless communication network N2.

In the present exemplary embodiment, before the game starts in the game machine 2, the mobile terminal 1 logs in to the server 3 according to an operation of the user, and acquires the encryption key and an ID token from the server 3 that corresponds to the first predetermined information for identifying the encryption key. The ID token herein is also user identification information for identifying the user of the mobile terminal 1.

Then, when the user plays the game at any one of the game machines 2, the mobile terminal 1 accepts an amount of play money to be spent to play a game at the game machine 2 from the user, and receives beacon signals from the game machine 2. The mobile terminal 1 generates encrypted information by encrypting the ID token and the amount of play money with the encryption key and transmits the encrypted information to the server 3 through the game machine 2 which transmitted the beacon signals.

When the server 3 receives the ID token and the amount of play money by decoding the received encrypted information, the server determines the validity of the ID token. When the server 3 determines that the ID token is valid, the server 3 transacts a payment according to the amount of play money acquired by the decoding and authorizes the game machine 2 to let the user corresponding to the ID token play at the game machine 2 up to the amount of the play money.

Next, the configuration of the mobile terminal 1, the game machine 2, and the server 3 that compose the transaction system S is explained.

[The Configuration of the Mobile Terminal 1]

Figure 2:
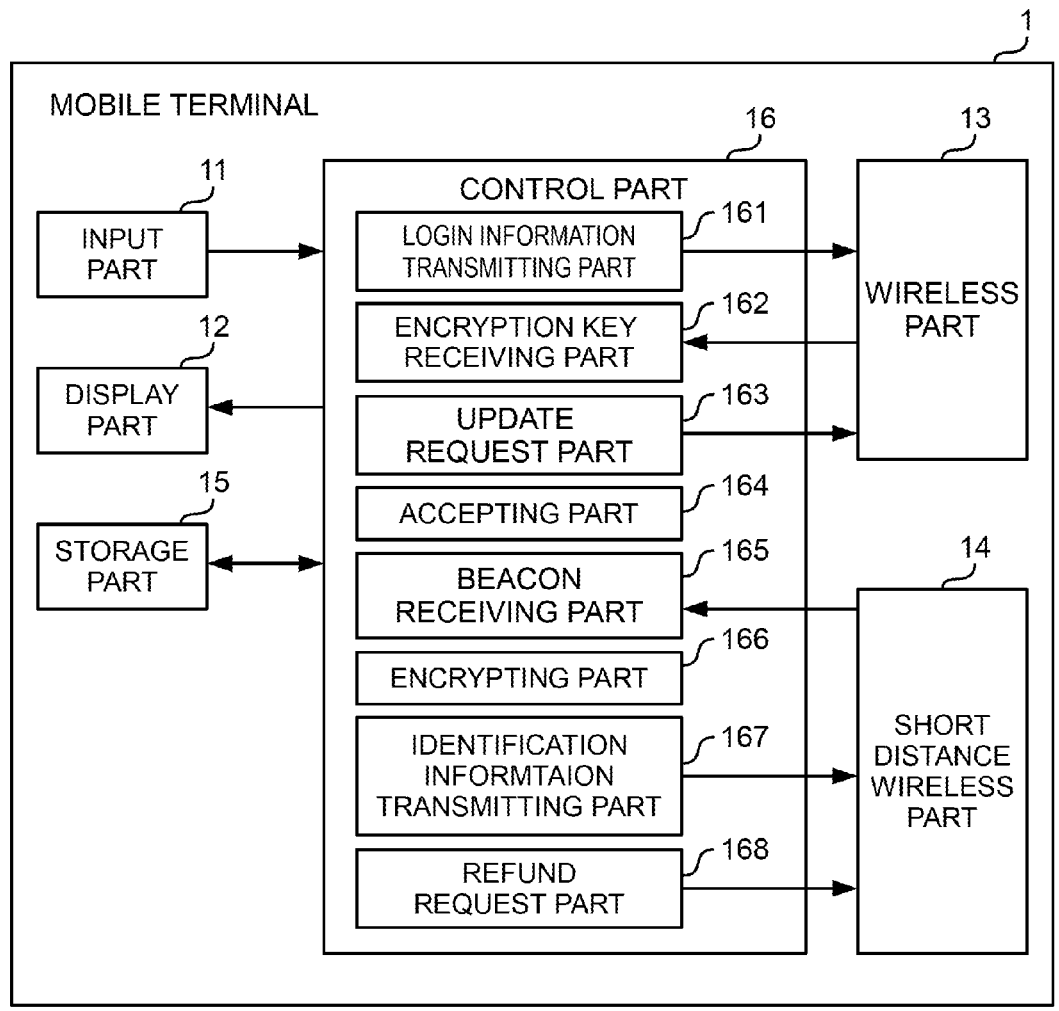
FIG. 2 shows a configuration of a mobile terminal according to the first exemplary embodiment.

Firstly, the configuration of the mobile terminal 1 is explained. FIG. 2 shows the configuration of the mobile terminal 1 according to the present exemplary embodiment. As shown in FIG. 2, the mobile terminal 1 includes an input part 11, a display part 12, a wireless part 13, a short distance wireless part 14, a storage part 15, and a control part 16.

The input part 11 consists of a button, a contact sensor, and the like placed on the display part 12, and accepts an operation of the user of the mobile terminal 1. The display part 12 consists of a liquid crystal display, an organic electro-luminescence (EL) display, and the like. The display part 12 displays characters, figures, and the like according to a control of the control part 16.

The wireless part 13 is a radio frequency (RF) part for transmitting and receiving information with the server 3 through the wireless communication network N2 and the communication network N1.

The short distance wireless part 14 is a RF part for transmitting and receiving information with the game machine 2 through the short distance wireless communication channel.

The storage part 15 consists of a read-only memory (ROM), a random-access memory (RAM), and the like. The storage part 15 stores a variety of programs to operate the mobile terminal 1. For example, the storage part 15 stores the casino application as an application program to make the control part 16 control the mobile terminal 1. The storage part 15 may store the casino application read from a storage medium, such as an external memory, and may store the casino application downloaded from an external device through the wireless communication network N2 and the communication network N1.

The control part 16 consists of, for example, a central processing unit (CPU). The control part 16 runs a variety of programs stored in the storage part 15 to control functions of the mobile terminal 1. The control part 16 includes the login information transmitting part 161, the encryption key receiving part 162, the update request part 163, the accepting part 164, the beacon receiving part 165, the encrypting part 166, the identification information transmitting part 167, and the refund request part 168. The details of each function provided by the control part 16 are explained later.

[The Configuration of the Game Machine 2]

Figure 3:
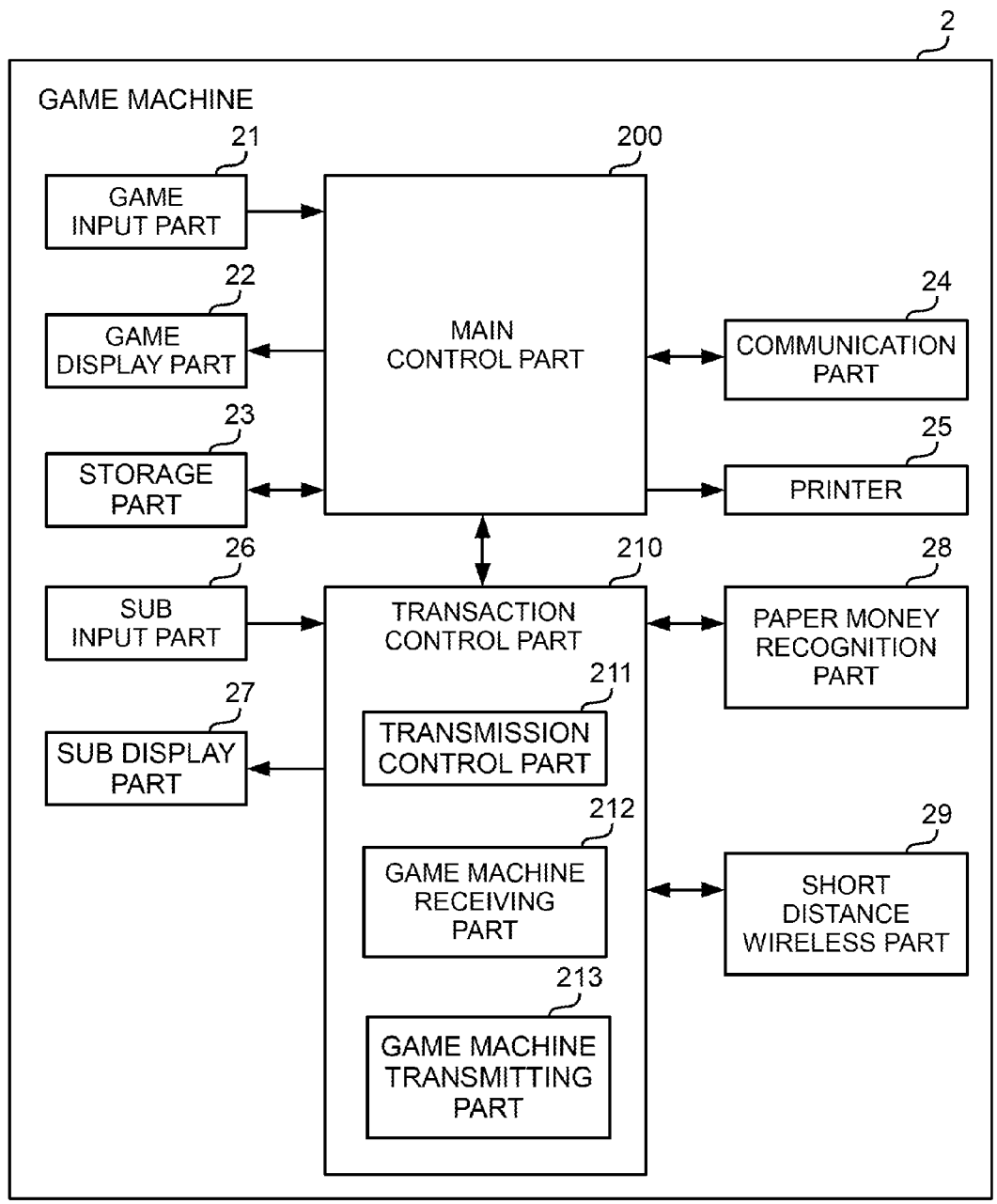
FIG. 3 shows the configuration of a game machine according to the first exemplary embodiment.

Next, the configuration of the game machine 2 is explained. FIG. 3 shows the configuration of the game machine 2 according to the present exemplary embodiment. As shown in FIG. 3, the game machine 2 includes a game input part 21, a game display part 22, a storage part 23, a communication part 24, a printer 25, a sub input part 26, a sub display part 27, a paper money recognition part 28, a short distance wireless part 29, a main control part 200, and a payment control part 210.

The game input part 21 consists of a button, a contact sensor, and the like placed on the game display part 22, and accepts an operation of the user of the mobile terminal 1 who plays the game at the game machine 2.

The game display part 22 includes a liquid crystal display, an organic EL display, or the like.

The game display part 22 displays a game screen that contains characters, figures, and the like according to the control of the main control part 200.

The storage part 23 includes the ROM, the RAM, and the like. The storage part 23 stores a variety of programs to operate the game machine 2.

The communication part 24 communicates with the server 3 through the communication network N1 according to the control of the main control part 200.

The printer 25 prints, for example, a receipt regarding a refund at the game machine 2 according to the control of the main control part 200.

The sub input part 26 includes, for example, a ten-key keyboard for accepting a ten-key input. When a payment from the user of the mobile terminal 1 is accepted through the mobile terminal 1, the sub input part 26 accepts an input of a personal identification number (PIN) of the mobile terminal 1.

The sub display part 27 includes the liquid crystal display, the organic EL display, or the like. The sub display part 27 displays a screen for inputting the PIN and the like according to the control of the transaction control part 210.

The paper money recognition part 28 is a unit for accepting the paper money inserted into the game machine 2. The paper money recognition part 28 recognizes the paper money inserted into the game machine 2 and accepts the payment. The game machine 2 may include a card recognition part that recognizes a casino's player card, and may accept the payment by credit converted from points stored in association with the recognized player card.

The short distance wireless part 29 performs short distance wireless communication with the mobile terminal 1 and receives the ID token, the encryption key, and the like from the mobile terminal 1. The short distance wireless part 29 functions as a transmitting part and transmits the beacon signals to establish a communication connection between the mobile terminal 1 and the game machine 2.

The main control part 200 includes, for example, a CPU. The main control part 200 controls functions of the game machine 2 by running a variety of programs stored in the storage part 23.

The transaction control part 210 includes a CPU. The transaction control part 210 controls transactions of the mobile terminal 1 by running a variety of programs stored in the storage part 23. The transaction control part 210 includes a transmission control part 211, a game machine receiving part 212, and a game machine transmitting part 213. The details of each function provided by the transaction control part 210 are explained later.

[The Configuration of the Server 3]

Figure 4:
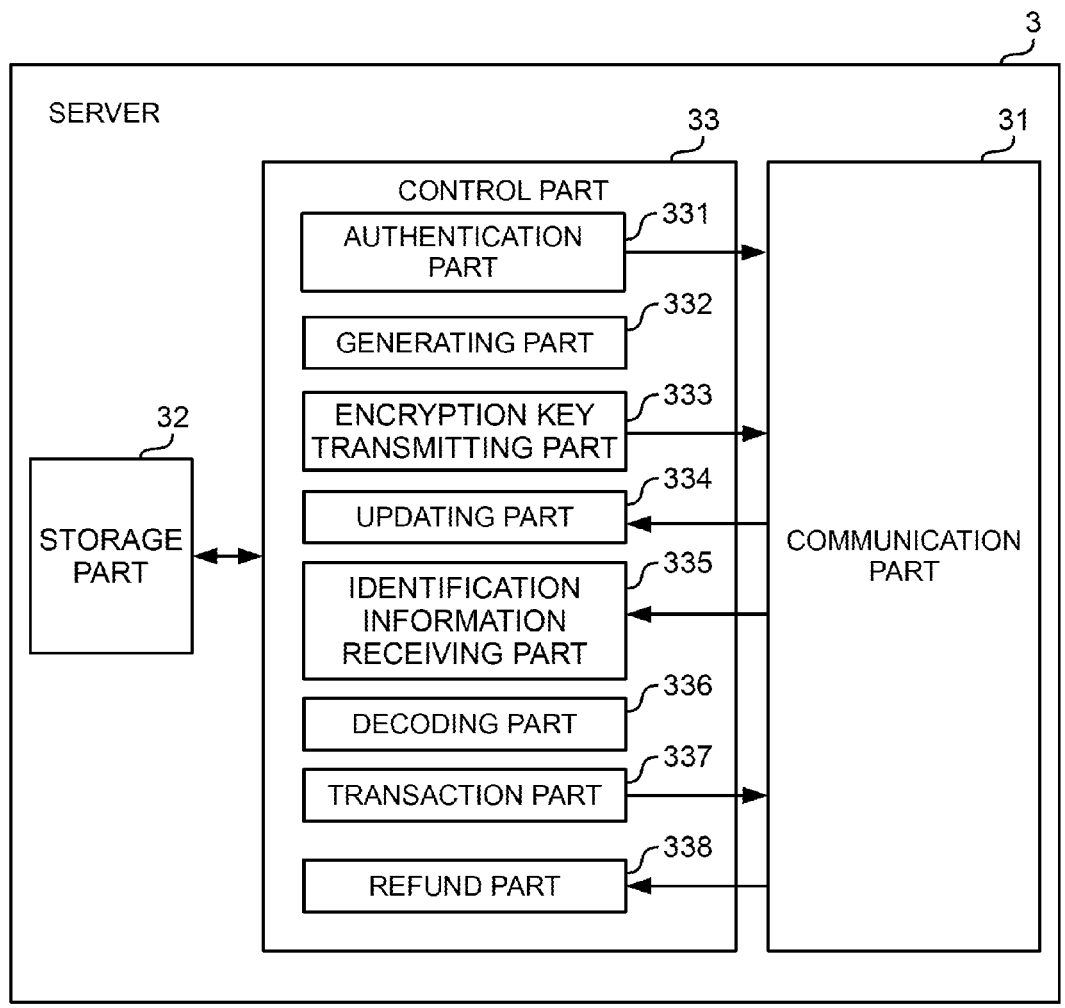
FIG. 4 shows the configuration of a server according to the first exemplary embodiment.

Next, the configuration of the server 3 is explained. FIG. 4 shows the configuration of the server 3 according to the present exemplary embodiment. As shown in FIG. 4, the server 3 includes a communication part 31, a storage part 32, and a control part 33.

The communication part 31 is a network adapter for the server 3 to communicate with the mobile terminal 1, the game machine 2, and the like. The communication part 31 communicates with the mobile terminal 1 through the communication network N1 and the wireless communication network N2 according to the control of the control part 33. The communication part 31 communicates with the game machine 2 through the communication network N1 according to the control of the control part 33.

The storage part 32 includes the ROM, the RAM, and the like. The storage part 32 stores a variety of programs to operate the server 3. The storage part 32 stores management information to manage information regarding the user of the mobile terminal 1. The details of the management information are explained later.

The control part 33 includes, for example, a CPU. The control part 33 controls functions of the server 3 by running a variety of programs stored in the storage part 32. The control part 33 includes an authentication part 331, a generation part 332, an encryption key transmitting part 333, an updating part 334, an identification information receiving part 335, a decoding part 336, a transaction part 337, and a refund part 338. The details of each function provided by the control part 33 are explained later.

[A Sequence of Sharing the Encryption Key]

Figure 5:
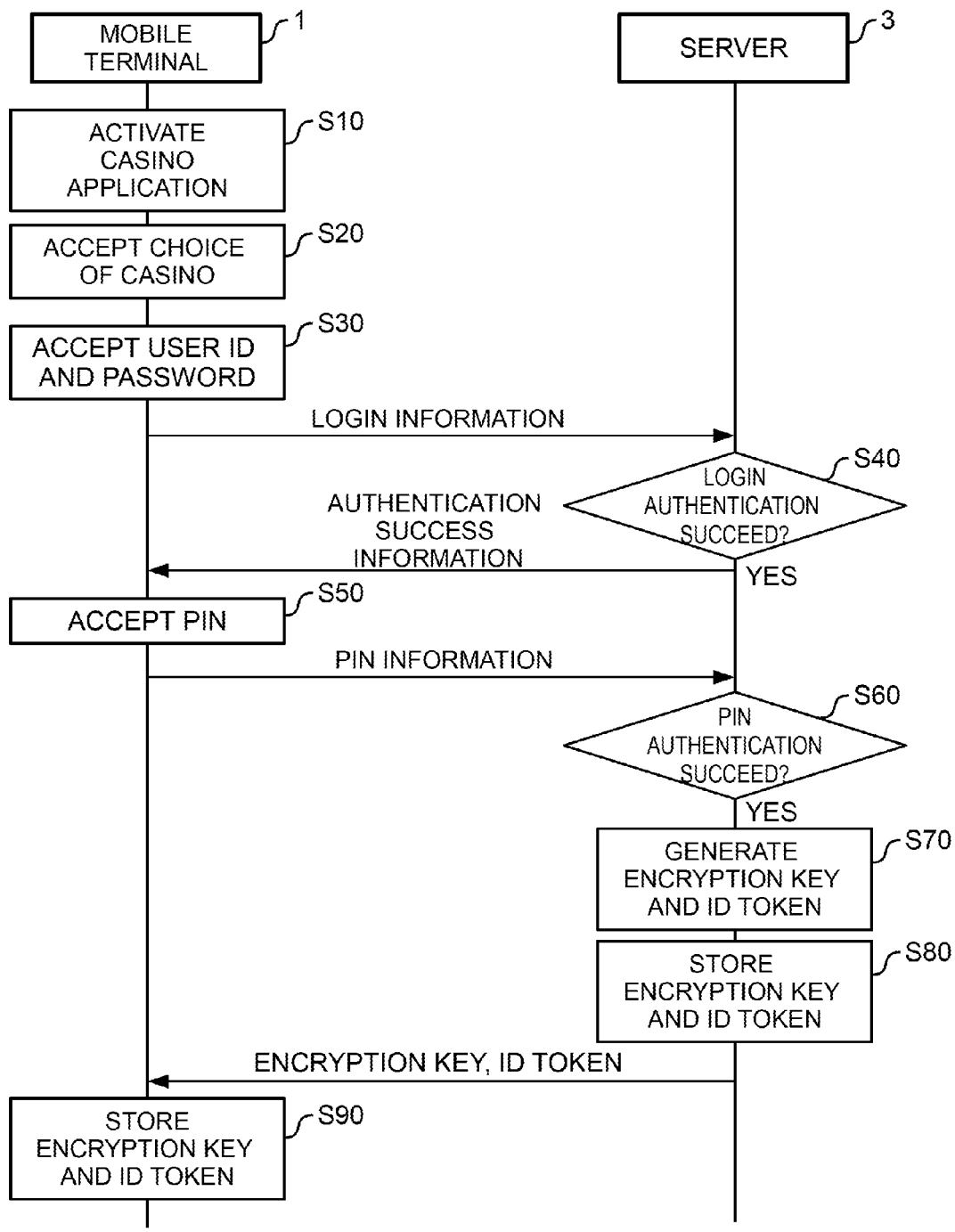
FIG. 5 shows an example of a communication sequence of the server and the mobile terminal according to the first exemplary embodiment sharing an encryption key.

The details of each function provided by the mobile terminal 1, the game machine 2, and the server 3 are explained according to the sequence of procedures in the transaction system S. Firstly, the sequence in which the server 3 authenticates the mobile terminal 1 and shares the encryption key with the mobile terminal 1 is explained. FIG. 5 shows an example of the communication sequence of sharing the encryption key between the server 3 and the mobile terminal 1 according to the first exemplary embodiment.

Figure 6:
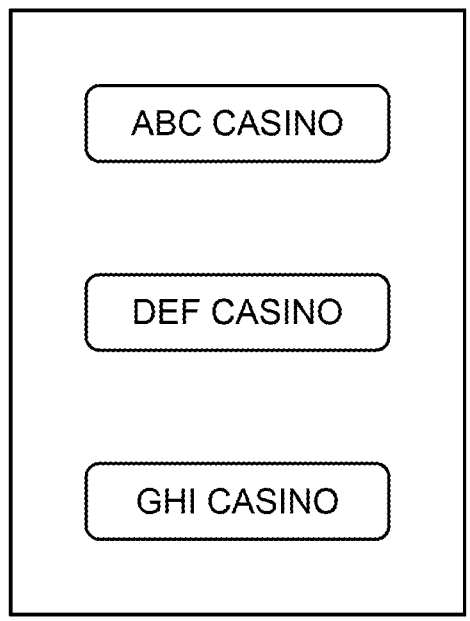
FIG. 6 shows an example of a casino choice screen.

Firstly, the mobile terminal 1 activates the casino application when the mobile terminal 1 accepts a predetermined operation from the user through the input part 11 (S10). When the casino application is activated, the login information transmitting part 161 displays a casino choice screen shown in FIG. 6 on the display part 12 for a user to choose a casino, and accepts a choice of a casino (S20). The login information transmitting part 161 specifies a property ID for identifying a chosen casino.

Figure 7:
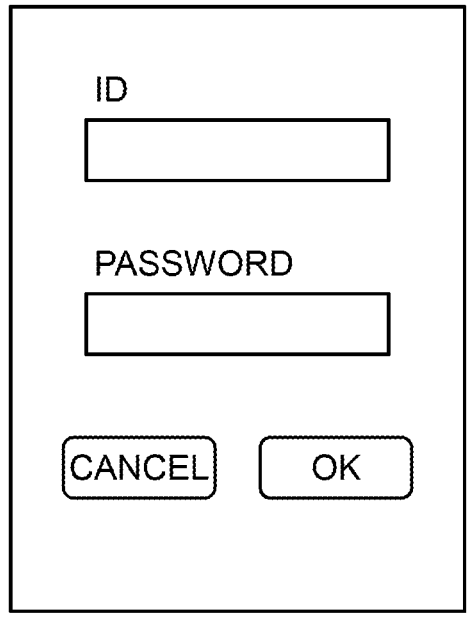
FIG. 7 shows an example of a login authentication screen.

When a casino is chosen, the login information transmitting part 161 displays a login authentication screen shown in FIG. 7 and accepts an input of a user ID and a password (S30). Specifically, the login information transmitting part 161 accepts the user ID and the password, when the user ID and the password are inputted through the input part 11 on the authentication screen and an OK button is pressed. The login information transmitting part 161 hashes the accepted user ID and password by using a hash function corresponding to, for example, a secure hash algorithm-2 (SHA-2). The user ID herein is master identification information for permanently identifying the user of the mobile terminal 1.

Figure 8:
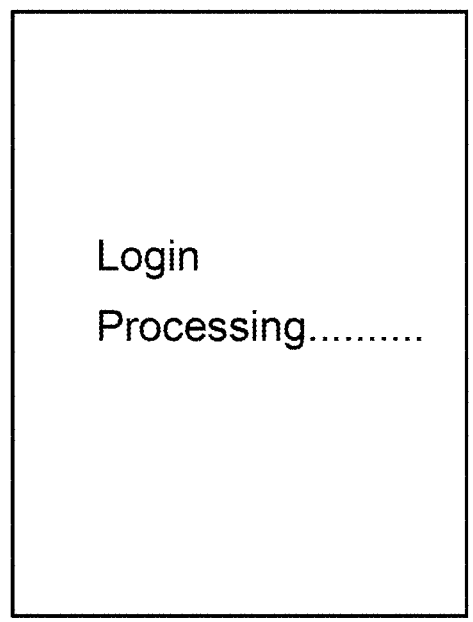
FIG. 8 shows an example of a wait screen.

Next, the mobile terminal 1 transmits the login information to the server 3. Specifically, the login information transmitting part 161 of the mobile terminal 1 transmits the hashed user ID and password, the specified property ID, and time information that indicates the present time to the server 3 as the login information. The login information transmitting part 161 may display a login wait screen shown in FIG. 8 while communicating with the server 3.

When the server 3 receives the login information, the server 3 performs authentication processing, and when the authentication based on the login information succeeds, the server 3 transmits the encryption key to the mobile terminal 1. The server 3 performs login authentication and PIN authentication as the authentication processing.

When the authentication part 331 of the server 3 receives the login information, the authentication part 331 performs the login authentication according to the login information and determines whether or not the login authentication succeeded (S40). Specifically, the authentication part 331 determines whether or not the difference between the time information contained in the login information and the time information, which indicates the present time, in the server 3 is within a predetermined time (for example, ten minutes). When the authentication part 331 determines that the difference is not within the predetermined time, it determines that the authentication failed and transmits error information to the mobile terminal 1.

When the authentication part 331 determines that the difference is within the predetermined time, the authentication part 331 performs authentication according to the user ID and the password contained in the login information. Specifically, the hashed user ID and the password are stored as the management information in the storage part 32 in association with each other and the identification part 331 determines whether or not the hashed user ID and password corresponding to the hashed user ID and password contained in the received login information are stored in the storage part 32 in association with each other.

Figure 9:
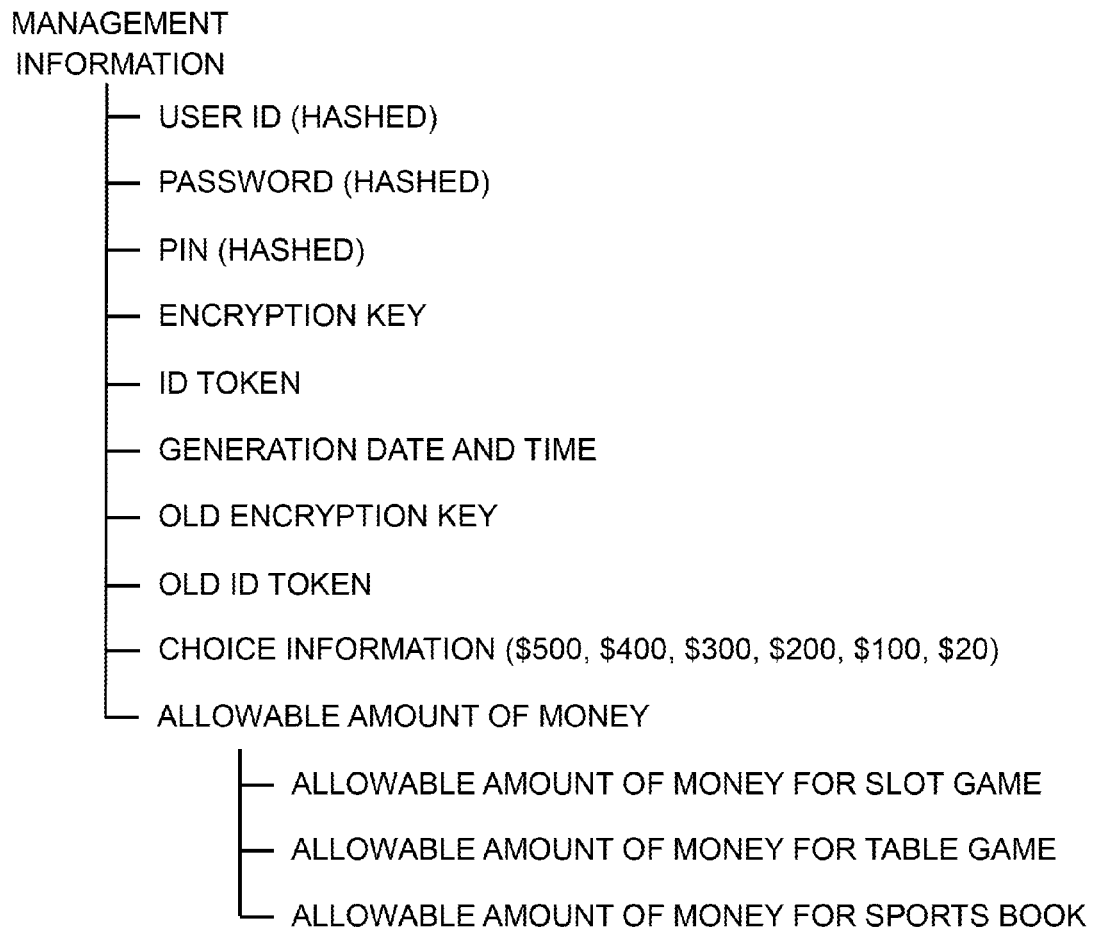
FIG. 9 shows a configuration example of management information.

FIG. 9 shows an exemplary configuration of management information according to the present exemplary embodiment. As shown in FIG. 9, the management information is information containing the hashed user ID, the hashed password, the hashed PIN, the encryption key and the ID token generated by the undermentioned generating part 332 or updating part 334, a generation date and time indicating a time when the encryption key and the ID token were generated, an old encryption key and an old ID token which are an encryption key and an ID token of a previous generation, choice information corresponding to choices for the amount of play money that the user can choose when the user plays the game at the game machine 2, and an allowable amount of money in association with each other. The allowable amount of money is associated with the allowable amount of money for the slot game, the allowable amount of money for the table game, and the allowable amount of money for the sports book.

If the hashed user ID and the password that correspond to those contained in the login information are stored in the storage part 32 in association with each other, the authentication part 331 determines that the authentication succeeded and transmits authentication success information to the mobile terminal 1. The authentication success information contains the choice information of the amount of play money associated with the user ID of the mobile terminal 1 in the management information.

When the login information transmitting part 161 of the mobile terminal 1 receives the authentication success information, it stores the choice information contained in the authentication success information in the storage part 15. Then, the login information transmitting part 161 displays a PIN authentication screen shown in FIG. 10 for accepting an input of the PIN, on the display part 12 and accepts an input of the PIN (S50). When the input of the PIN is accepted, the login information transmitting part 161 hashes the inputted PIN. The login information transmitting part 161 transmits the hashed user ID which has been previously inputted at S30 and the hashed PIN as PIN information to the server 3, and displays the wait screen shown in FIG. 8 on the display part 12.

The login information transmitting part 161 temporarily stores the inputted PIN in the storage part 15 to use the inputted PIN for the PIN authentication when the amount of play money is inputted. Here, the login information transmitting part 161 may hash the PIN and temporarily stores it in the storage part 15 or may encrypt the hashed PIN with a private key and temporarily store it in the storage part 15. By this means, it is possible to prevent the PIN temporarily stored in the storage part 15 from being acquired by a third person and to prevent fraudulent authentication using the PIN.

When the authentication part 331 of the server 3 receives the PIN information that contains the hashed user ID and the hashed PIN, the authentication part 331 performs the PIN authentication, and determines whether or not the PIN authentication succeeded (S60). Specifically, the authentication part 331 refers to the management information and determines that the PIN authentication succeeded when the hashed user ID and the hashed PIN corresponding to those contained in the received PIN information are stored in the storage part 32 in association with each other.

When the authentication part 331 determines that the PIN authentication succeeded, the server 3 starts an authentication session with the mobile terminal 1.

Specifically, when the authentication part 331 determines that the PIN authentication succeeded, the generating part 332 generates the encryption key and the ID token for identifying the encryption key in association with the user ID (S70). The encryption key is a public key corresponding to, for example, an Advanced Encryption Standard (AES) 128. The generating part 332 stores the hashed user ID in association with the generated encryption key and ID token in the storage part 32 as one piece of the management information.

Next, the encryption key transmitting part 333 transmits the generated encryption key and ID token to the mobile terminal 1. The encryption key receiving part 162 receives the encryption key and the ID token from the server 3, and stores the encryption key and the ID token in the storage part 15 in association with each other (S90). When the encryption key and the ID token are stored in the storage part 15, the control part 16 of the mobile terminal 1 may determine that the authentication is completed and display the authentication completion screen shown in FIG. 11.

In the above description, the server 3 generates the encryption key and the ID token and transmits them to the mobile terminal 1, and the encryption key and the ID token are shared between the server 3 and the mobile terminal 1, but the method for sharing them is not necessarily so limited. The server 3 may transmit encryption key information for specifying the encryption key and the ID token to the mobile terminal 1, and the mobile terminal 1 may generate the encryption key and the ID token according to the received encryption key information. In this manner, the encryption key and the ID token may be shared between the server 3 and the mobile terminal 1.

Specifically, the server 3 and the mobile terminal 1 may share the encryption key and the ID token by using the Diffie-Hellman key exchange algorithm. More specifically, the server 3 generates a public key YA as the encryption key information according to a previously prepared private key XA, a publicized prime number p, and a natural number a, and transmits the public key XA to the mobile terminal 1. The mobile terminal 1 generates a public key YB as the encryption key information according to a previously prepared private key XB, a publicized prime number p, and a natural number a, and transmits the public key YB to the server 3. The server 3 generates the encryption key according to the received public key YB and the prime number p. Similarly, the mobile terminal 1 also generates the encryption key according to the received public key YA and the prime number p. Each of the server 3 and the mobile terminal 1 generates the ID token in the same process. By this means, the server 3 and the mobile terminal 1 can securely share the encryption key and the ID token.

Figure 12:
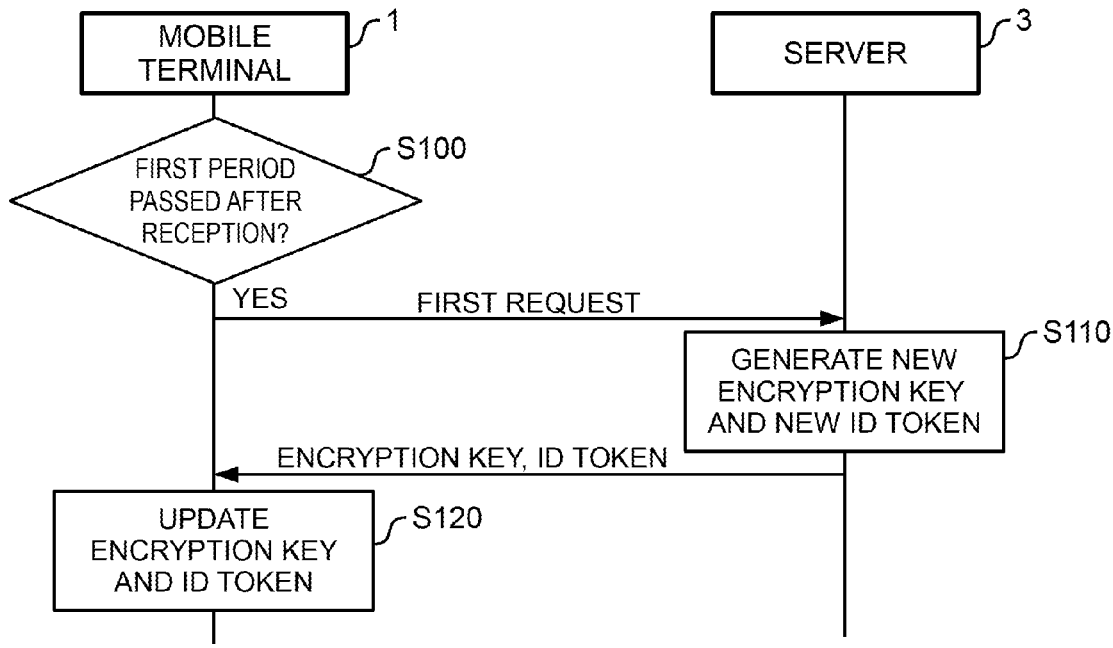
FIG. 12 shows an example of the communication sequence of the mobile terminal and the server according to the first exemplary embodiment updating an encryption key and an ID token.

Next, a flow of a process of updating the encryption key and the ID token in the mobile terminal 1 and the server 3 is explained. FIG. 12 shows an example of the communication sequence of updating the encryption key and the ID token of the mobile terminal 1 and the server 3 according to the first exemplary embodiment.

The update request part 163 of the mobile terminal 1 determines whether or not the first period has passed after the encryption key was received (S100). When the update request part 163 of the mobile terminal 1 determines that the first period has passed after receiving the encryption key, it transmits the first request for requiring acquisition of a new encryption key to the server 3. When the updating part 334 of the server 3 receives the first request, the updating part 334 generates a new encryption key and an ID token (S110), and transmits them to the mobile terminal 1.

The updating part 334 changes the status of the encryption key and the ID token stored in the management information to be an old encryption key and an old ID token. The updating part 334 associates the newly generated encryption key with the newly generated ID token in the management information.

When the update request part 163 of the mobile terminal 1 receives the encryption key and the ID token from the server 3, it updates the encryption key and the ID token stored in the storage part 15 to the received encryption key and ID token (S120). By this means, the encryption key and the ID token are periodically updated and the security can be enhanced.

Figure 13:
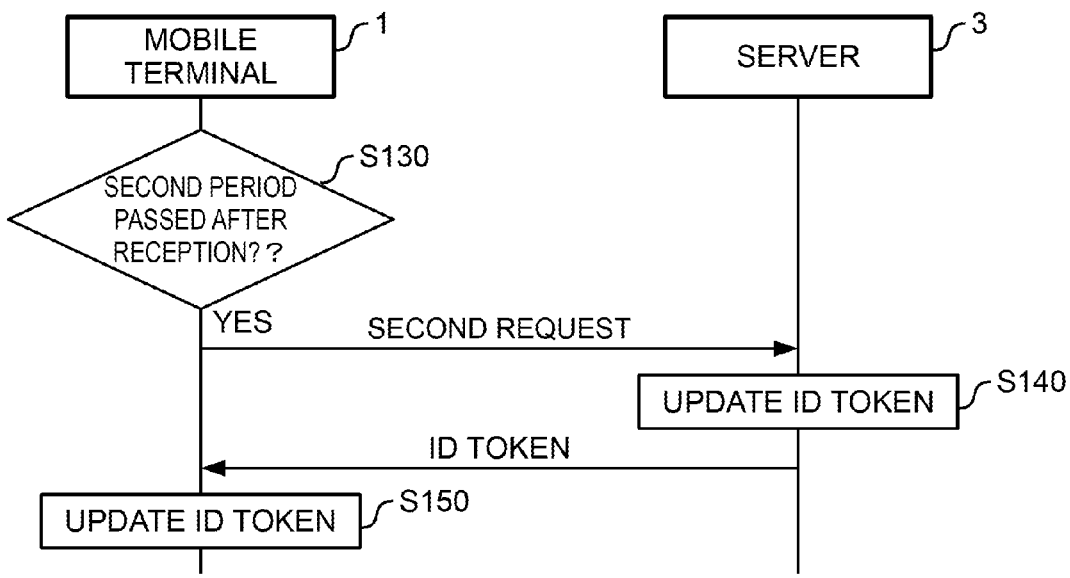
FIG. 13 shows an example of the communication sequence of the mobile terminal and the server according to the first exemplary embodiment updating only the ID token.

The updates of the encryption key and the ID token are performed at the same timing in the above description but the timings are not necessarily so limited, and the updates may be performed at different timings. FIG. 13 shows an example of the communication sequence of updating only the ID token of the mobile terminal 1 and the server 3 according to the first exemplary embodiment.

The update request part 163 of the mobile terminal 1 determines whether or not the second period has passed after the ID token was received (S130). The second period differs from the first period. When the update request part 163 of the mobile terminal 1 determines that the second period has passed after receiving the ID token, it transmits the second request for requiring acquisition of new ID token to the server 3.

When the updating part 334 of the server 3 receives the second request, it generates the new ID token in association with the user ID (S140). The updating part 334 changes the encryption key and the ID token, which are associated with each other in the management information, to an old encryption key and an old ID token. The updating part 334 associates the encryption key with the generated ID token in the management information. The updating part 334 transmits the generated ID token to the mobile terminal 1.

When the update request part 163 of the mobile terminal 1 receives the ID token, it updates the ID token stored in the storage part 15 to the received ID token. (S150).

In the present exemplary embodiment, the mobile terminal 1 updates the encryption key and the ID token stored in the storage part 15 according to the encryption key and the ID token acquired from the server 3, but the mobile terminal 1 is not necessarily so limited. For example, the mobile terminal 1 may store a plurality of sets of the encryption key and the ID token, and switch the set of the encryption key and the ID token used for encryption to another set when the first period passes. The encryption key and the ID token can be properly changed even in the state where radio waves hardly reach the mobile terminal 1 by acquiring a plurality of sets of the encryption key and the ID token in advance.

[A Sequence of Starting the Game]

Figure 14:
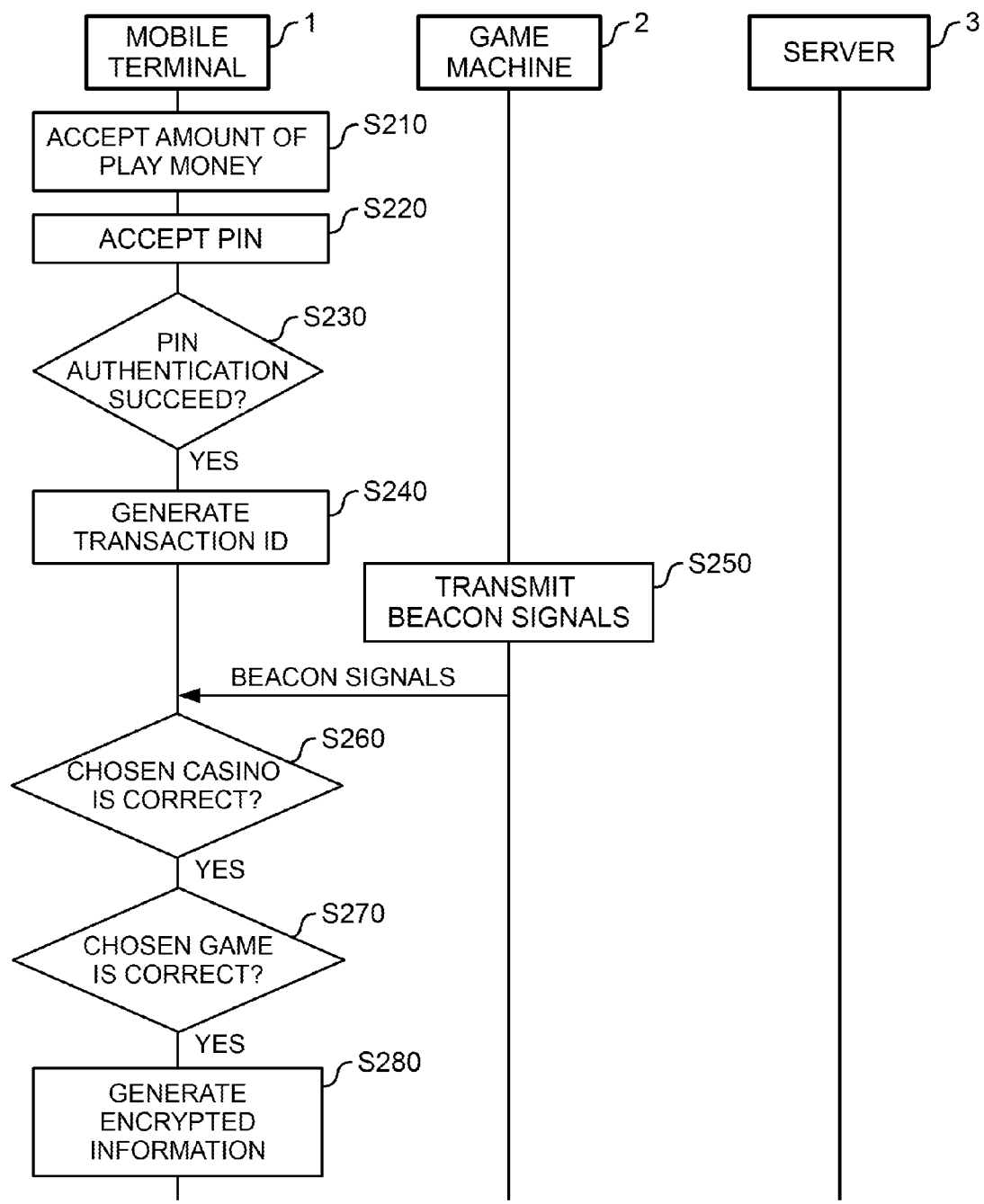
FIG. 14 shows an example of the communication sequence of starting a game in a game machine through the mobile terminal according to the first exemplary embodiment.
Figure 15:
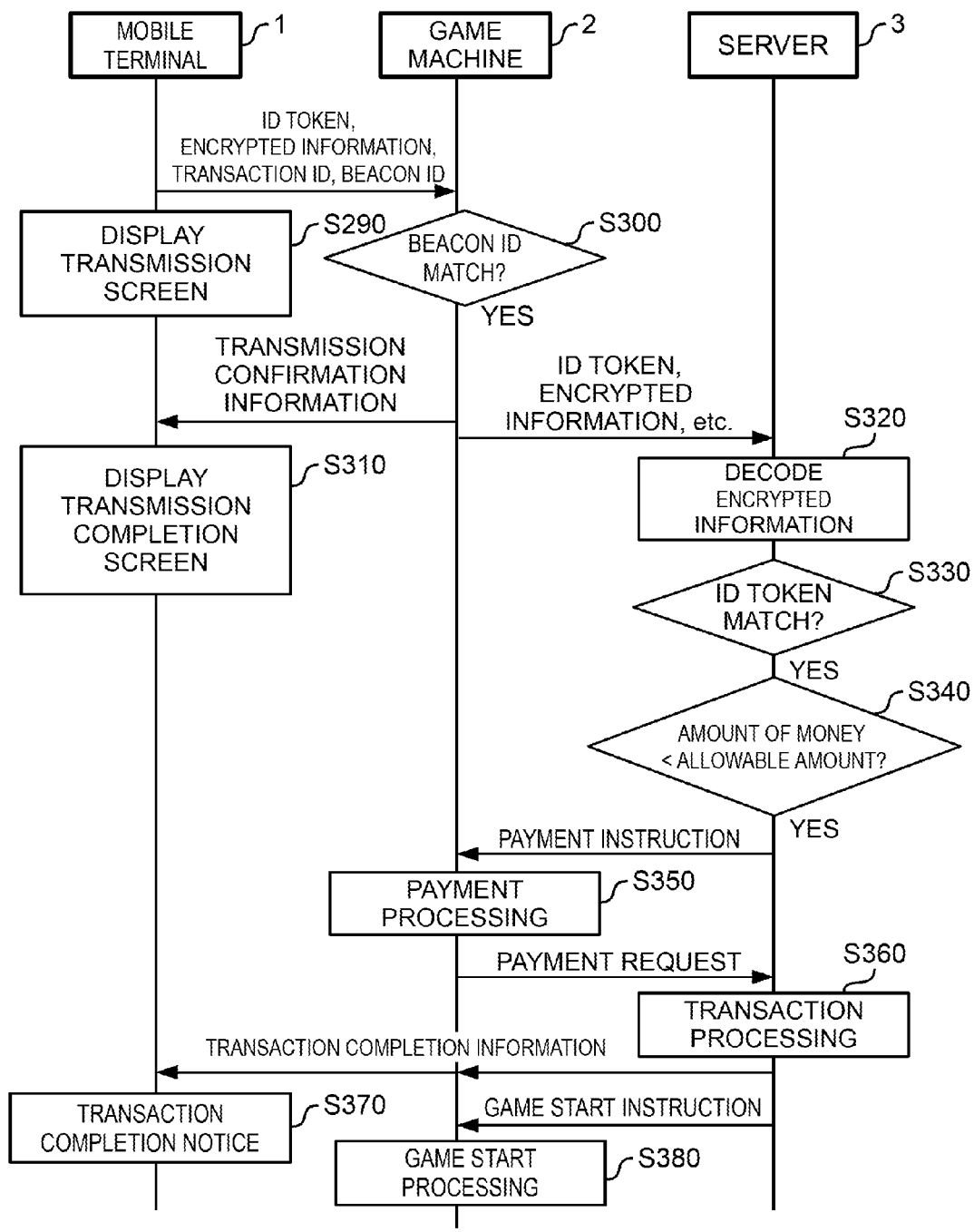
FIG. 15 shows a sequence continued from FIG. 14.

A flow of starting the game in the game machine 2 by inserting the play money to the game machine 2 through the mobile terminal 1 is explained. FIG. 14 and FIG. 15 show an example of the communication sequence of starting the game in the game machine 2 through the mobile terminal 1. Here, the mobile terminal 1 has completed the authentication with the server 3. When the authentication result has expired because a predetermined time has passed after the completion of the authentication, the mobile terminal 1 and the server 3 perform the authentication process corresponding to the sequence shown in FIG. 5 again.

Figure 11:
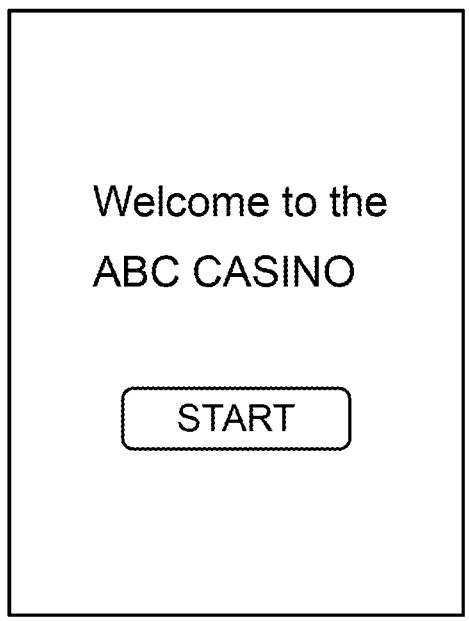
FIG. 11 shows an example of an authentication completion screen.
Figure 16:
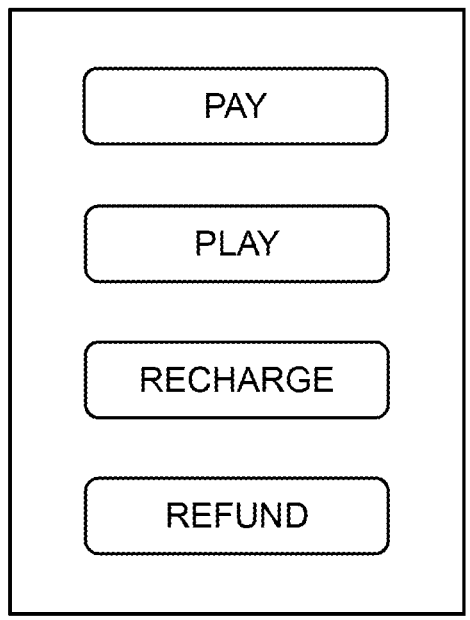
FIG. 16 shows an example of a menu screen.

When the authentication completion screen shown in FIG. 11 is displayed on the display part 12 of the mobile terminal 1, and a start button provided on the authentication completion screen is pressed, the accepting part 164 displays the menu screen shown in FIG. 16 on the display part 12. The menu screen includes a pay button, a start button, a charge button, and a refund button. For example, the user of the mobile terminal 1 pushes the pay button on the menu screen displayed on the display part 12 in front of the game machine 2 with which the user wants to play.

Figure 17:
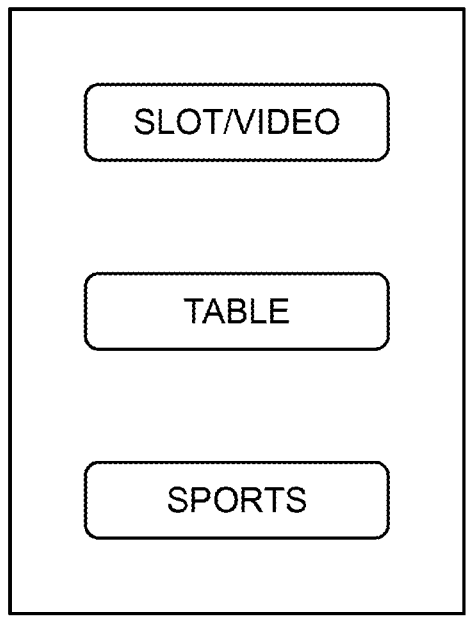
FIG. 17 shows an example of a game choice screen.
Figure 18:
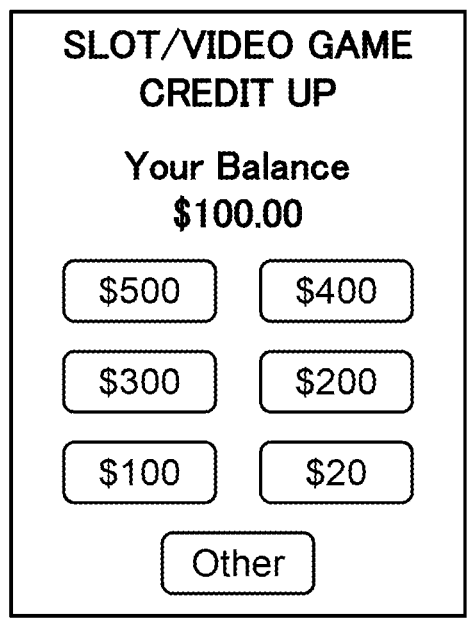
FIG. 18 shows an example of a money amount acceptance screen.

When the pay button on the menu screen is pressed, the accepting part 164 displays the game choice screen on the display part 12 as shown in FIG. 17 and accepts a choice of a type of game. Buttons corresponding to a slot/video game, a table game, and a sports book are displayed on the game choice screen, and when any of the buttons is pressed, the accepting part 164 displays the money amount acceptance screen for accepting the amount of play money chosen on the game choice screen on the display part 12 as shown in FIG. 18.

Here, the accepting part 164 displays a plurality of choices for the amount of play money corresponding to the user of the mobile terminal 1 on the money amount acceptance screen displayed on the display part 12 according to the choice information stored in the storage part 15, and accepts a user's choice of the amount of play money (S210). The accepting part 164 acquires the amount of play money chosen from the choices for the amount of play money displayed on the money amount acquiring screen as the amount of money for playing a game in the game machine 2. The amount of play money herein includes currency information that indicates a type of currency, and money amount information that indicates the amount of play money. When an "Other" button is chosen on the money amount acceptance screen shown in FIG. 18, the accepting part 164 displays a screen for accepting an input of numerical values, and accepts the amount of play money through the screen.

Figure 10:
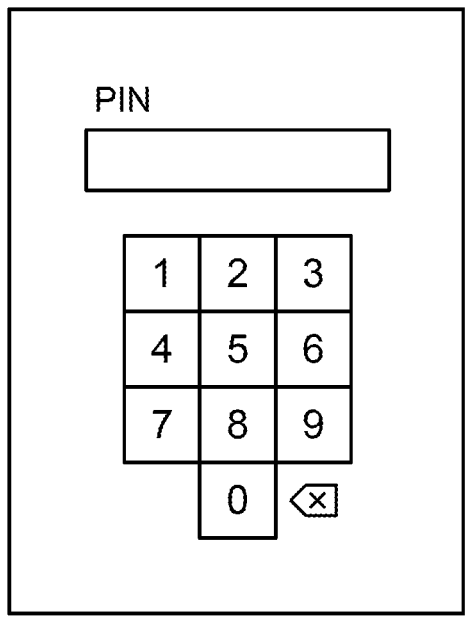
FIG. 10 shows an example of a personal identification number (PIN) input screen.

When the accepting part 164 acquires the amount of play money, it displays the PIN authentication screen shown in FIG. 10 on the display part 12 and accepts the input of the PIN (S220). When the PIN is inputted, the accepting part 164 performs the PIN authentication and determines whether or not the PIN authentication succeeded (S230). Specifically, when the inputted PIN matches with the PIN stored in the storage part 15, the accepting part 164 determines that the PIN authentication succeeded and generates a transaction ID (S240). The transaction ID is used to establish a connection between the mobile terminal 1 and the game machine 2. When the transaction ID is generated, the beacon receiving part 165 starts receiving the beacon signals transmitted from the game machine 2.

The transmission control part 211 of the game machine 2 makes the short distance wireless part 29 periodically (for example, once every second) transmit the beacon signals (S250). The beacon signals contain a device ID for identifying the game machine 2, type information for indicating the type of games provided by the game machine 2, a property ID for identifying the casino where the game machine 2 is installed, and a beacon ID for identifying the beacon signals respectively transmitted by a plurality of game machines 2. The beacon ID is generated according to, for example, random numbers, and is changed at a predetermined timing. For example, the transmission control part 211 changes the beacon ID according to the random numbers in every transmission of the beacon signals. A risk of a wiretapping can be reduced by changing the beacon ID.

The transmission control part 211 may transmit the beacon signals for a period of time when it detects a predetermined operation in the game input part 21 or the sub input part 26 of the game machine 2. By this means, the possibility that the mobile terminal 1 chooses the beacon signals transmitted from the game machine 2 chosen by the user is increased.

The beacon receiving part 165 receives the beacon signals from the game machine 2 through the short distance wireless part 14. When the beacon receiving part 165 receives the beacon signals from a plurality of game machines 2, the beacon receiving part 165 chooses any of the game machines 2 that transmitted the beacon signals whose intensity of the received radio wave is higher than a predetermined intensity. More specifically, the beacon receiving part 165 may choose the game machine 2 corresponding to the beacon signal whose intensity of the received radio wave is the highest within a predetermined period from among the game machines 2 that transmitted beacon signals whose intensity of the received radio wave is higher than the predetermined intensity when the beacon receiving part 165 receives the beacon signals from a plurality of game machines 2. By this means, the game machine 2 with which the user of the mobile terminal 1 wants to play can be chosen with accuracy.

After the beacon receiving part 165 chooses a beacon signal by using the above-mentioned procedure, the control part 16 determines whether or not the game machine 2 and the mobile terminal 1 can be connected according to information contained in the beacon signals. If the control part 16 determines that the game machine 2 and the mobile terminal 1 can be connected, the control part 16 establishes a communication connection between the mobile terminal 1 and the game machine 2 that transmitted the chosen beacon signals.

Specifically, when the beacon receiving part 165 chooses the beacon signals, the encrypting part 166 determines whether or not the casino chosen by the user of the mobile terminal 1 is correct (S260). More specifically, the encrypting part 166 determines whether or not the casino indicated by the property ID contained in the chosen beacon signals matches with the casino chosen by the user of the mobile terminal 1 on the casino choice screen shown in FIG. 6. When the encrypting part 166 determines that the casino indicated by the property ID differs from the casino chosen by the user of the mobile terminal 1, the encrypting part 166 displays error information on the display part 12 of the mobile terminal 1. By this means, it is possible to prevent the play money from being erroneously paid to the casino where the user does not play.

When the encrypting part 166 determines that the casino indicated by the property ID matches with the casino chosen by the user of the mobile terminal 1, it determines whether or not the type of the game chosen by the user of the mobile terminal 1 is correct (S270). Specifically, the encrypting part 166 determines whether or not the type of the game indicated by the type information contained in the chosen beacon signals matches with the type of the game chosen by the user of the mobile terminal 1 on the game choice screen shown in FIG. 17. When the encrypting part 166 determines that the type of the game indicated by the type information contained in the chosen beacon signals differs from the type of the game chosen by the user of the mobile terminal 1, it displays the error information on the display part 12 of the mobile terminal 1. By this means, it is possible to prevent the play money from being erroneously paid for the game that the user does not play.

When the encrypting part 166 determines that the type of the game indicated by the type information contained in the chosen beacon signal matches with the type of the game chosen by the user of the mobile terminal 1, the encrypting part 166 generates encrypted information by encrypting the ID token stored in the storage part 15 and the amount of play money chosen from the choices for the amount of play money with the encryption key stored in the storage part 15 (S280).

Next, a sequence shown in FIG. 15 is explained. When the encrypted information is generated, the identification information transmitting part 167 transmits the ID token and the encrypted information to the server 3 through the game machine 2 chosen according to the radio wave intensity corresponding to the beacon signals. Specifically, the identification information transmitting part 167 transmits the ID token, the encrypted information, the transaction ID, and the beacon ID contained in the received beacon signals to the game machine 2 through the short distance wireless part 14.

Figure 19:
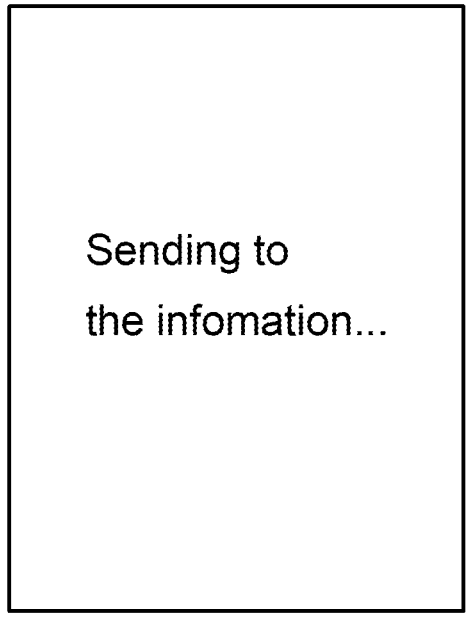
FIG. 19 shows an example of a transmission screen.

Here, the identification information transmitting part 167 transmits the ID token, the encrypted information, the transaction ID, and the beacon ID to the server 3 through the game machine 2 after the game machine 2 transmits the beacon signal and before the game machine 2 transmits another beacon signal. Because the beacon ID is changed in every transmission of the beacon signals, transmitting the beacon ID before the change of the beacon ID can let the game machine 2 determine whether the transmitted beacon ID matches with the received beacon ID. The identification information transmitting part 167 transmits the encrypted information and the like to the game machine 2, and displays the transmission screen indicating that the information is currently transmitted, on the display screen 12 as shown in FIG. 19 (S290).

When the game machine receiving part 212 receives the ID token, the encrypted information, the transaction ID, and the beacon ID through the short distance wireless part 29, it determines whether or not the received beacon ID matches with the beacon ID that the game machine 2 transmitted (S300).

When the game machine receiving part 212 determines that the beacon IDs match with each other, the game machine transmitting part 213 transmits transmission confirmation information that indicates that the encrypted information and the like from the mobile terminal 1 were received by the mobile terminal 1 without problems. The transmission confirmation information contains the transaction ID received by the game machine receiving part 212. When the control part 16 of the mobile terminal 1 receives the transmission confirmation information, it displays the transmission completion screen on the display 12 as shown in FIG. 20 (S310).

The game machine transmitting part 213 transmits the ID token, the encrypted information, the transaction ID, the device ID, the type information, and the property ID to the server 3. Here, when the game machine transmitting part 213 transmits the information, it temporarily inhibits an insertion of paper money to the paper money recognition part 28. The identification information receiving part 335 of the server 3 receives the ID token, the encrypted information, the transaction ID, the device ID, the type information, and the property ID from the game machine 2.

Next, the decoding part 336 refers to the management information in the storage part 32, which stores the encryption key and the ID token in association with each other, and specifies the encryption key associated with the ID token transmitted to the server 3. The decoding part 336 decodes the encrypted information by using the specified encryption key (S320).

Next, when the ID token received by the server 3 matches with the ID token acquired by decoding the encrypted information, the transaction part 337 transacts a payment according to the user ID of the mobile terminal 1 and the amount of play money acquired by decoding the encrypted information, and authorizes the game machine 2 to let the user play up to the amount of play money.

Specifically, the transaction part 337 determines whether or not the ID token received by the server 3 matches with the ID token acquired by decoding the encrypted information. (S330). When the transaction part 337 determines that the two ID tokens match, and the amount of play money acquired by decoding the encrypted information is less than or equal to the allowable amount of money of the user previously stored as the management information in the storage part 15 in association with the user ID, the transaction part 337 conducts a transaction according to the user ID of the mobile terminal 1 and the amount of play money acquired by decoding the encrypted information.

That is, when the transaction part 337 determines that the two ID tokens match, it refers to the management information and specifies the allowable amount of money corresponding to the received type information among the allowable amount of money associated with the ID token. The transaction part 337 determines whether or not the amount of play money acquired by decoding the encrypted information is less than or equal to the specified allowable amount of money (S340).

When the transaction part 337 determines that the amount of play money is less than or equal to the specified allowable amount of money, it transmits payment instruction for instructing payment of the play money to the game machine 2. By this means, the server 3 can prevent the user of the mobile terminal 1 from playing more than the allowed amount of money. The payment instruction herein contains the money amount information which indicates the amount of play money.

When the transaction control part 210 of the game machine 2 receives the payment instruction, it performs payment processing according to the money amount information which indicates the amount of play money (S350). When the transaction control part 210 completes the payment processing, it transmits a payment request including the money amount information that indicates the amount of play money paid and the ID token to the server 3.

When the transaction part 337 of the server 3 receives the payment request, it specifies the user ID associated with the ID token contained in the payment request and performs the transaction processing to change a balance of electronic money of the user ID (S360). For example, the user ID of the user of the mobile terminal 1 and balance information indicating the balance of the electronic money possessed by the user are associated with each other in the storage part 32, and the transaction part 337 subtracts the amount of money indicated by the money amount information contained in the payment request from the balance of electronic money associated with the specified user ID.

The balance information of the electronic money may be managed, for example, by a transaction server. In this case, the transaction part 337 may transmit the balance change request containing the user ID and information indicating a changed amount of the balance of the electronic money to the transaction server.

Next, the transaction part 337 transmits transaction completion information indicating that the transaction has been completed to the mobile terminal 1 through the game machine 2. The mobile terminal 1 receives the transaction completion information and then displays on the display part 12 that the transaction has been completed according to the transaction completion information (S370).

When the transaction part 337 determines that the amount of play money is less than or equal to the specified allowable amount of money, it transmits the ID token, the transaction ID, and the amount of play money to the game machine 2 as a game start instruction. When the game machine receiving part 212 of the game machine 2 receives the game start instruction, it performs game start processing and starts the game with the amount of play money as a maximum (S380).

After the game starts, the ID token and the transaction ID are held in the game machine 2 or the server 3 until (i) the game ends, (ii) an operation of ending the game is accepted by the mobile terminal 1 or the game machine 2, (iii) the encrypted information from another mobile terminal 1 different from the mobile terminal 1 is received, or (iv) the amount of play money is acquired through something other than the mobile terminal 1. By this means, the game machine 2 and the server 3 can specify the user of the mobile terminal 1 who is playing the game at the game machine 2.

[A Sequence of a User Confirmation During the Play]

After the game at the game machine 2 starts, the game machine 2 transmits user confirmation beacon signals to the mobile terminal 1 to determine whether or not the user of the mobile terminal 1 is playing the game. The game machine 2 determines whether the user of the mobile terminal 1 is playing the game according to a receiving condition of response signals transmitted by the mobile terminal 1 as a response to the user confirmation beacon signals.

Figure 21:
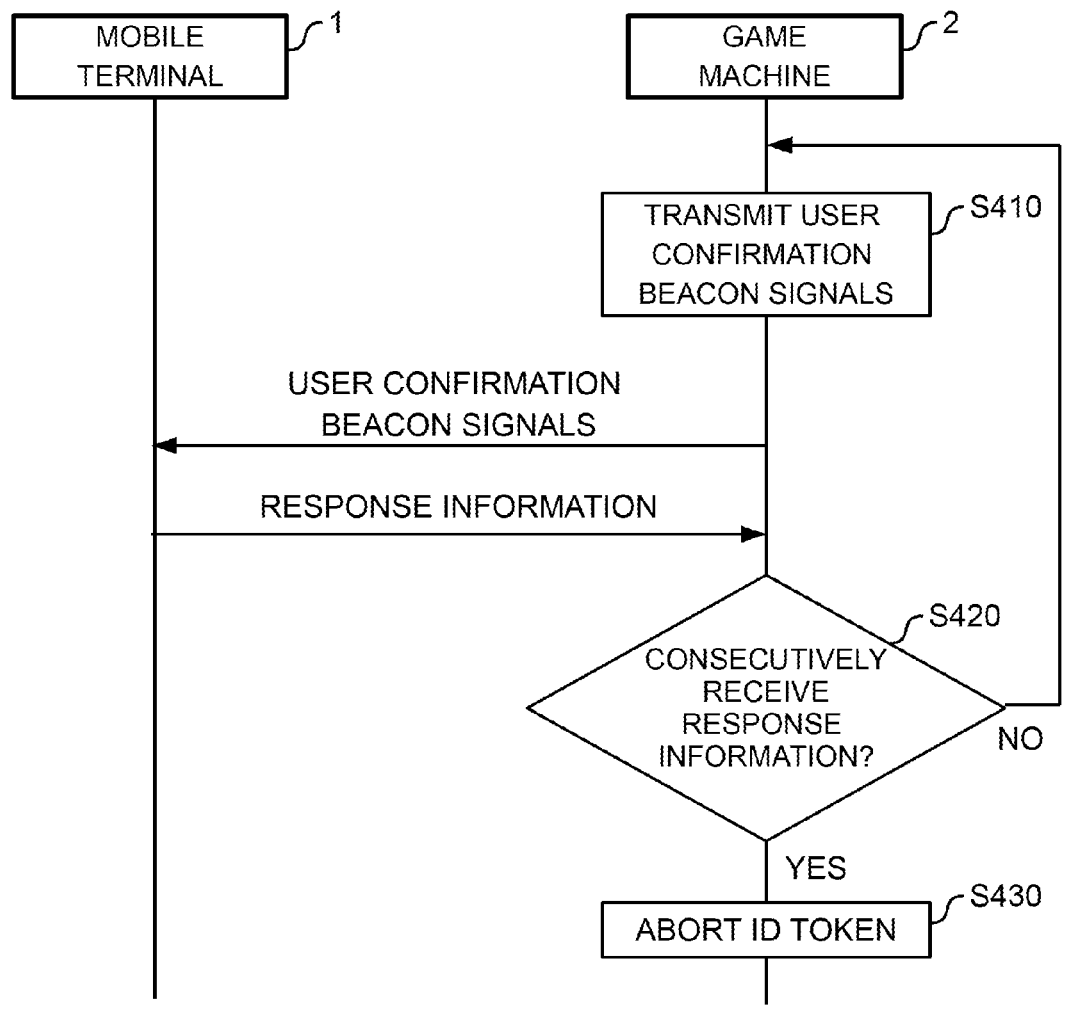
FIG. 21 shows an example of the communication sequence of confirming a user of the mobile terminal after the game in the game machine is started.

FIG. 21 shows an example of the communication sequence of confirming the user of the mobile terminal 1 after the game at the game machine 2 started. The game machine 2 and the server 3 herein hold the ID token and the transaction ID.

When the game machine 2 holds the ID token, the transmission control part 211 of the game machine 2 periodically transmits the user confirmation beacon signals that contain user confirmation information for confirming the user to the mobile terminal 1 through the short distance wireless part 29 (S410). The user confirmation information herein is, for example, the ID token.

When the beacon receiving part 165 of the mobile terminal 1 receives the user confirmation beacon signals, the identification information transmitting part 167 determines whether or not the ID tokens contained in the signals match with the ID token stored in the storage part 15 of the mobile terminal 1. If the identification information transmitting part 167 determines that the ID tokens match, it transmits the ID token to the game machine 2 as response information to the user confirmation beacon signals.

When the game machine receiving part 212 of the game machine 2 receives the response information, it determines whether or not it consecutively receives the response information a predetermined number of times (S420). When the determination is NO, the game machine receiving part 212 performs the processing of S410. Thus, the transmission control part 211 repeats transmission of the user confirmation beacon signals.

When the determination is YES, namely when the response information cannot be consecutively received a predetermined number of times, the game machine receiving part 212 aborts the ID token and stops specifying the user of the mobile terminal 1 according to the ID token (S430). The game machine receiving part 212 may display information indicating that the user of the mobile terminal 1 cannot be specified on the game display part 22 through the main control part 200.

[A Sequence of Refunding of the Play Money]

Figure 22:
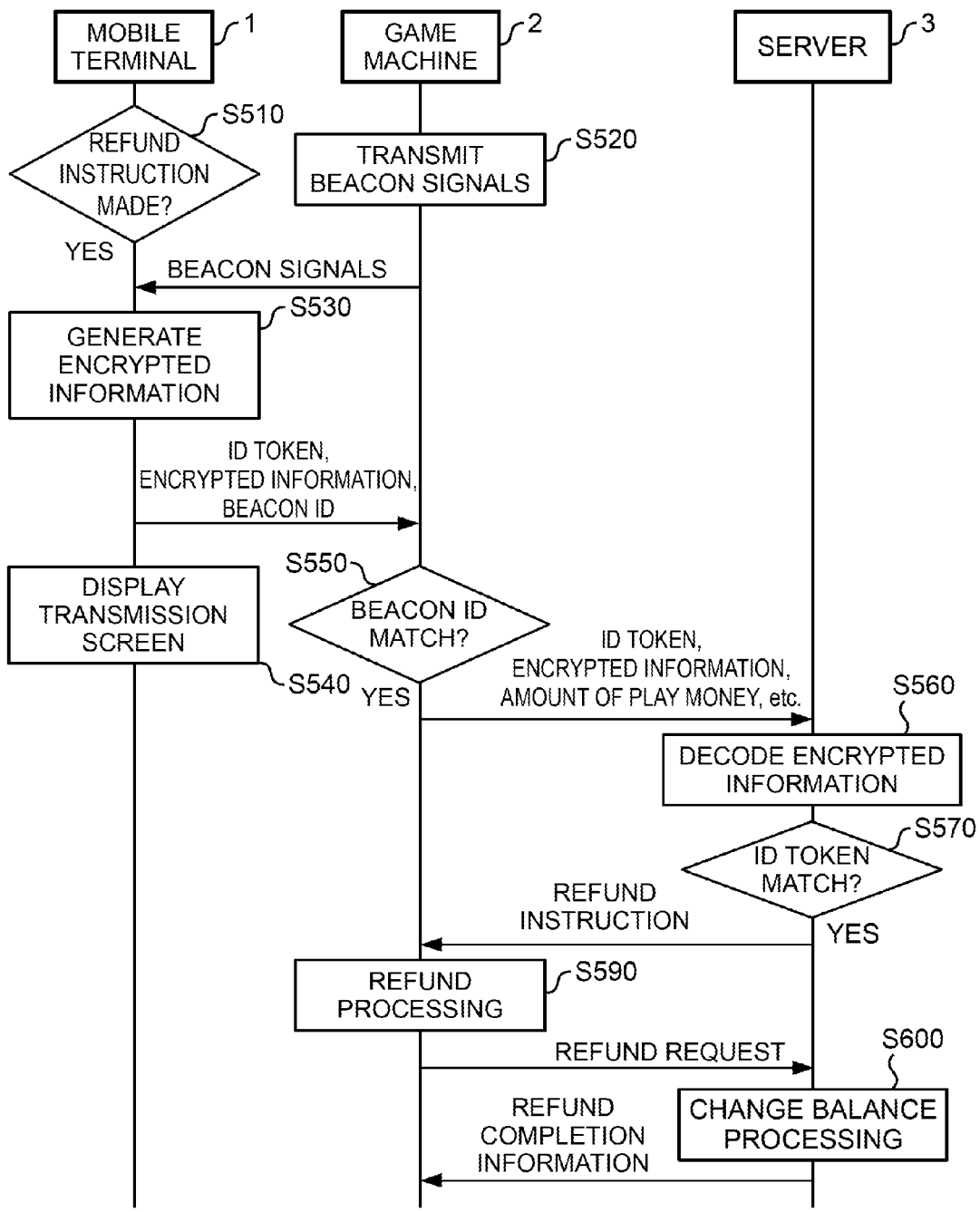
FIG. 22 shows an example of the communication sequence of refunding play money after the game in the game machine is started.

A flow of a process for refunding any of the play money after the game at the game machine 2 has started is explained. If play money remains in the game machine 2, the transaction control part 210 of the game machine 2 refunds the remaining money to the user corresponding to the ID token when an operation of the user of the mobile terminal 1 to end the game is received. FIG. 22 shows an example of the communication sequence of refunding the play money after the game at the game machine 2 has started. The server 3 herein holds the encryption key and the ID token.

The refund request part 168 acquires an instruction to refund the money remaining in the game machine after the game has ended by receiving the refund operation through the input part 11 (S510).

When the refund request part 168 receives the refund instruction, it makes the beacon receiving part 165 start receiving the beacon signals transmitted by the game machine 2.

The transmission control part 211 of the game machine 2 makes the short distance wireless part 29 periodically transmit the beacon signals (S520), and the beacon receiving part 165 receives the beacon signals from the game machine 2 through the short distance wireless part 14. When the beacon receiving part 165 receives the beacon signals, the encrypting part 166 encrypts the ID token by using the encryption key stored in the storage part 15 and shared with the server 3, and generates the encrypted information (S530). If the refund request part 168 receives the refund instruction, the mobile terminal 1 and the server 3 may perform the login authentication and the PIN authentication, and acquire the encryption key and the ID token (the second predetermined information) from the server 3.

When the encrypted information is generated, the identification information transmitting part 167 transmits the ID token and the encrypted information to the server 3 through the game machine 2. Specifically, the identification information transmitting part 167 transmits the ID token, the encrypted information, and the beacon ID contained in the received beacon signals to the game machine 2 through the short distance wireless part 14. The identification information transmitting part 167 transmits the encrypted information and the like to the game machine 2 and then displays the transmission screen indicating that the information is currently transmitted on the display screen 12 as shown in FIG. 19 (S540).

When the game machine receiving part 212 receives the ID token, the encrypted information, and the beacon ID through the short distance wireless part 29, it determines whether or not the received beacon ID matches with the beacon ID transmitted by the game machine 2 (S550). When the game machine receiving part 212 determines that the beacon IDs match, the game machine transmitting part 213 transmits the ID token, the encrypted information, the amount of play money, the type information, the device ID, and the property ID to the server 3.

The identification information receiving part 335 of the server 3 receives the ID token, the encrypted information, the amount of play money, the type information, the device ID, and the property ID from the game machine 2.

Next, the decoding part 336 refers to the management information in the storage part 32, which stores the encryption key and the ID token in association with each other, and specifies the encryption key associated with the ID token transmitted to the server 3. The decoding part 336 decodes the encrypted information with the specified encryption key (S560).

When the ID token received by the server 3 matches with the ID token acquired by the decoding, the refund part 338 refunds the money remaining in the game machine 2 to the user corresponding to the user ID associated with the ID token.

Specifically, the refund part 338 determines whether or not the ID token received by the server 3 matches with the ID token acquired by decoding the encrypted information (S570). When the refund part 338 determines that the ID tokens match, it transmits the refund instruction instructing a refund of the play money to the game machine 2.

When the transaction control part 210 of the game machine 2 receives the refund instruction, it performs refund processing for refunding only the amount of play money that can be converted into cash, out of the remaining play money, to the user (S590).

For example, if the user started the game by using the credit converted from points stored in the casino's player card, the credit cannot be converted into cash if the game ends before all the credit was used up. Therefore, the transaction control part 210 calculates the remaining money that can be converted into cash by deducting the amount of play money corresponding to the credit from the amount of remaining play money, and transmits the refund request that contains remaining money information indicating the remaining money and the ID token to the server 3.

When the refund part 338 of the server 3 receives the refund request, the refund part 338 specifies the user ID associated with the ID token according to the ID token contained in the refund request. Then, the refund part 338 performs balance change processing to change the balance of electronic money associated with the specified user ID according to the remaining money information contained in the refund request (S600). When the refund part 338 completes the balance change processing, the refund part 338 transmits refund completion information indicating that the refund is completed to the game machine 2. When the transaction control part 210 of the game machine 2 receives the refund completion information, the transaction control part 210 displays the information indicating that the refund was completed on the sub display 27.

In a sequence shown in FIG. 22, an example of refunding in accordance with the refund instruction made on the mobile terminal 1 is explained, but the game machine 2 may directly receive the refund instruction from the user.

Figure 23:
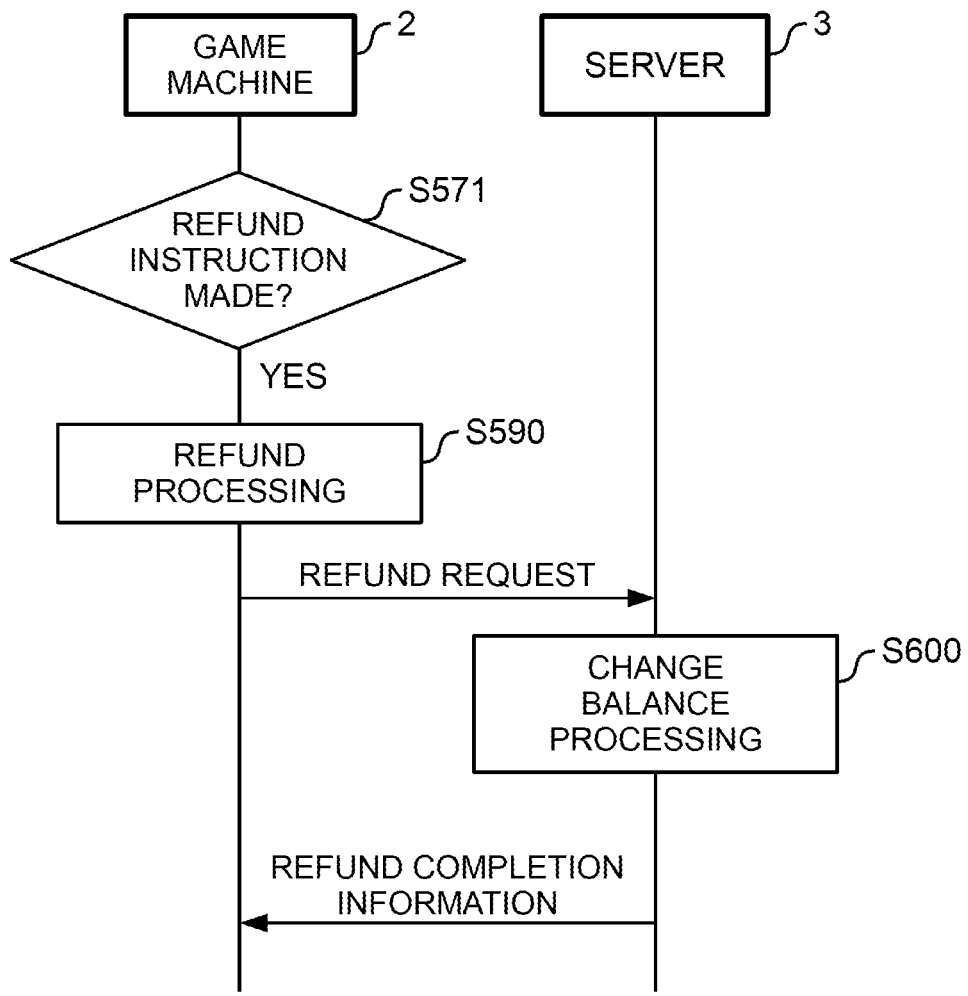
FIG. 23 shows an example of the communication sequence of refunding the play money after the game in the game machine is started.

That is, as shown in FIG. 23, the game machine 2 may determine whether or not the refund instruction is inputted (S571), and the game machine 2 and the server 3 may execute the processing in and after S590 in accordance with the refund instruction.

As described above, according to the present embodiment, in the transaction system S, the mobile terminal 1 shares the encryption key with the server 3 at the time of login. When the user of the mobile terminal 1 starts playing the game, the encrypted information is generated by encrypting the ID token with the encryption key in the mobile terminal 1, and the ID token and the encrypted information are transmitted from the mobile terminal 1 to the server 3 through the game machine 2. The received encrypted information is decoded in the server 3, and if the ID token received by the server matches with the ID token acquired by the decoding, the transaction is performed according to the user ID for identifying the user of the mobile terminal 1 and the amount of play money.

By this means, the mobile terminal 1 can perform the encrypting without a delay by using the encryption key previously shared with the server 3 even if the game machine 2 is installed in a place where the mobile terminal 1 cannot receive radio waves well. Further, because the transaction system S communicates with the mobile terminal 1 and the game machine 2 by using encryption with the encryption key, the game can be started by securely exchanging electronic data between the mobile terminal 1 and the game machine 2.

The Second Exemplary Embodiment

The Amount of Play Money is Inputted and the PIN Authentication is Performed in the Game Machine 2

Next, the second exemplary embodiment is explained. In the first exemplary embodiment, the input of the amount of play money and the PIN authentication at the time of inputting the amount of play money are performed in the mobile terminal 1. On the other hand, the second exemplary embodiment is different from the first exemplary embodiment in that the input of the amount of play money and the PIN authentication are performed in the game machine 2, and is the same as the first exemplary embodiment with respect to the other points. Hereinafter, the second exemplary embodiment is explained by referring to figures. For a configuration identical to the first exemplary embodiment, the same numerical references are used and detailed explanation is appropriately omitted.

Figure 24:
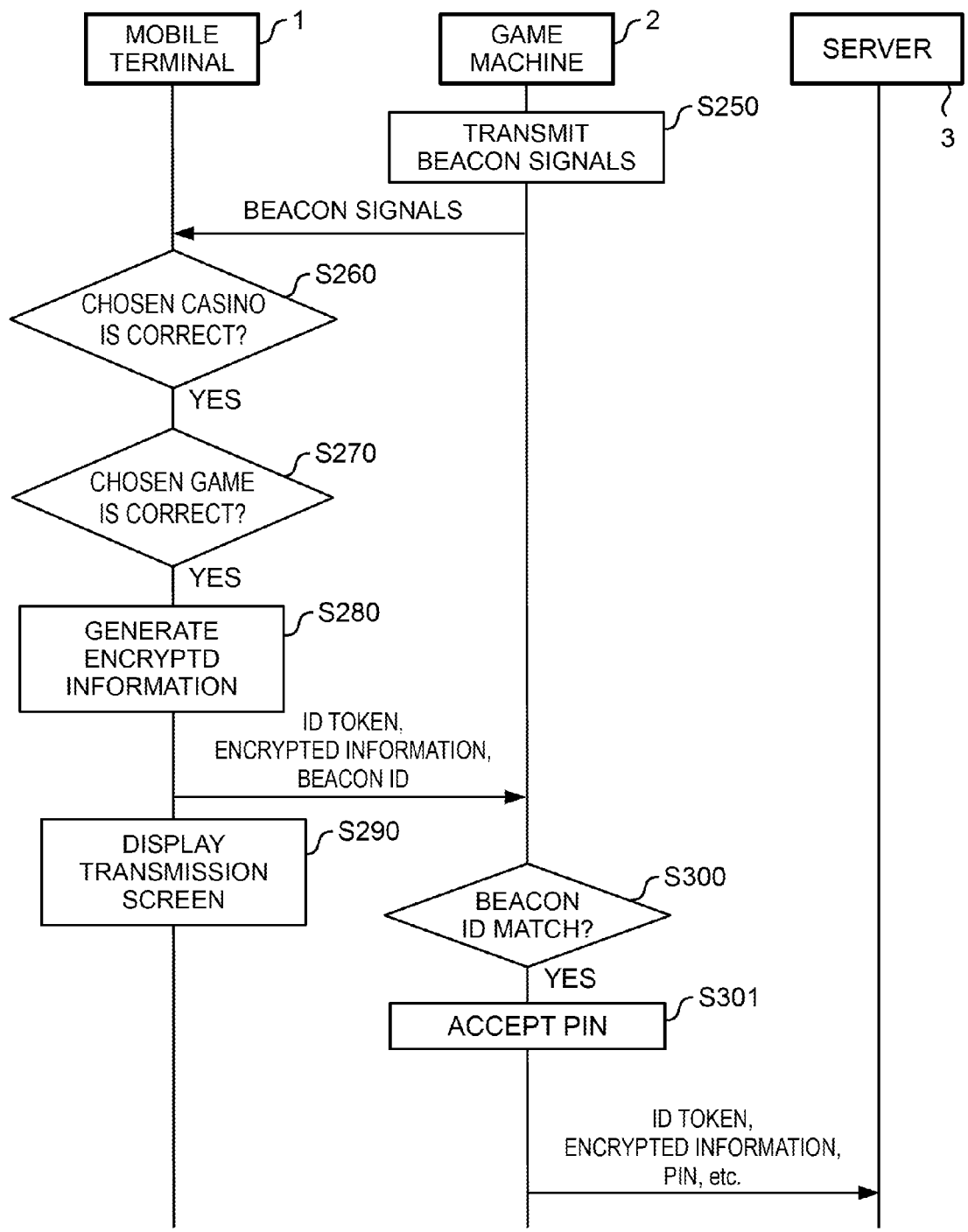
FIG. 24 shows an example of the communication sequence of starting the game in the game machine through the mobile terminal according to the second exemplary embodiment.
Figure 25:
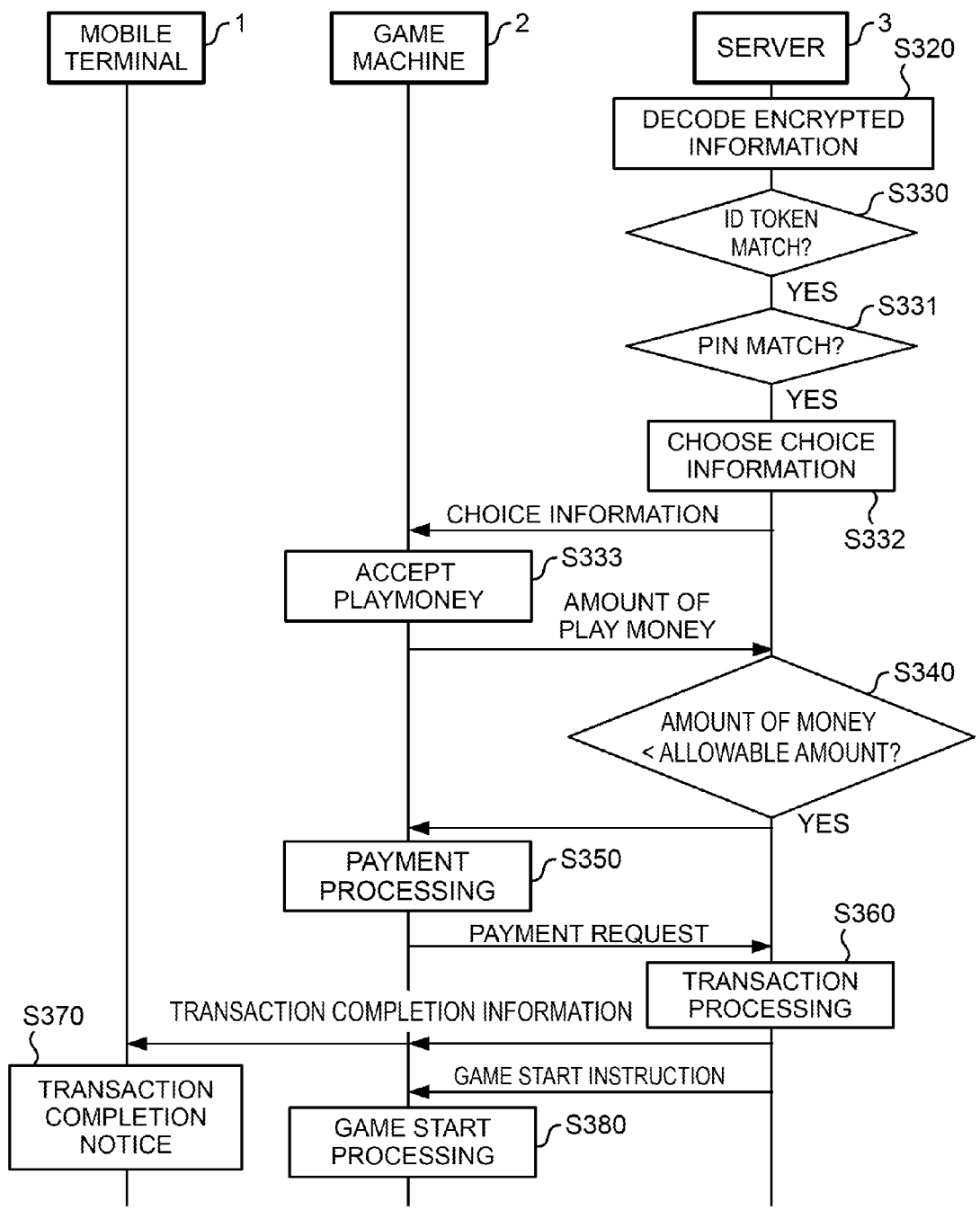
FIG. 25 shows a sequence continued from FIG. 24.

FIG. 24 and FIG. 25 show an example of the communication sequence of starting the game in the game machine 2 through a mobile terminal 1 according to the second exemplary embodiment. Here, the mobile terminal 1 has completed authentication in the server 3.

If a start button displayed on the authentication completion screen is pressed when the authentication completion screen shown in FIG. 11 is displayed on the display part 12 of the mobile terminal 1, the accepting part 164 displays the menu screen shown in FIG. 16 on the display part 12. When the pay button on the menu screen is pressed, the accepting part 164 displays the game choice screen shown in FIG. 17 on the display part 12 and accepts the choice of a type of a game. When any one of the buttons is pressed, the beacon receiving part 165 starts receiving the beacon signals transmitted from the game machine 2.

The transmission control part 211 of the game machine 2 makes the short distance wireless part 29 periodically transmit the beacon signals (S250). The beacon receiving part 165 receives the beacon signals from the game machine 2 through the short distance wireless part 14.

When the beacon receiving part 165 receives the beacon signals, the encrypting part 166 determines whether or not the casino chosen by the user of the mobile terminal 1 is correct (S260). If the encrypting part 166 determines that the casino indicated by the property ID matches with the casino chosen by the user of the mobile terminal 1, the encrypting part 166 determines whether or not the type of the game chosen by the user of the mobile terminal 1 is correct (S270).

When the encrypting part 166 determines that the type of the game indicated by the type information matches with the type of the game chosen by the user of the mobile terminal 1, the encrypting part 166 generates encrypted information by encrypting the ID token stored in the storage part 15 by using the encryption key stored in the storage part 15 (S280).

When the encrypted information is generated, the identification information transmitting part 167 transmits the ID token and the encrypted information to the server 3 through the game machine 2 corresponding to the received beacon signals. Specifically, the identification information transmitting part 167 transmits the ID token, the encrypted information, and the beacon ID contained in the received beacon signals to the game machine 2 through the short distance wireless part 14. The identification information transmitting part 167 transmits the encrypted information and the like to the game machine 2 and displays the transmission screen indicating that the information is currently transmitted on the display screen 12 as shown in FIG. 19 (S290).

When the game machine receiving part 212 receives the ID token, the encrypted information, and the beacon ID through the short distance wireless part 29, it determines whether or not the received beacon ID matches with the beacon ID that the game machine 2 transmitted (S300).

When the game machine receiving part 212 determines that the beacon IDs match, the transaction control part 210 displays the PIN authentication screen shown in FIG. 10 on the sub display part 27 and accepts the input of the PIN (S301). When the transaction control part 210 accepts the input of the PIN, it hashes the PIN. Then, the game machine transmitting part 213 transmits the ID token, the encrypted information, the PIN, the type information, the device ID, and the property ID to the server 3.

The identification information receiving part 335 of the server 3 receives the ID token, the encrypted information, the PIN, the type information, the device ID, and the property ID from the game machine 2. Next, the decoding part 336 refers to the management information in the storage part 32, which stores the encryption key and the ID token in association with each other, and specifies the encryption key associated with the ID token transmitted to the server 3. The decoding part 336 decodes the encrypted information by using the specified encryption key (S320).

The transaction part 337 determines whether or not the ID token received by the server 3 matches with the ID token acquired by decoding the encrypted information. (S330).

When the transaction part 337 determines that the two ID tokens match, it determines whether or not the received PIN matches with the PIN associated with the ID token in the management information (S331). When the transaction part 337 determines that the PINs match, it chooses the choice information according to the ID token (S332) and transmits the choice information to the game machine 2.

When the game machine receiving part 212 of the game machine 2 receives the choice information, the transaction control part 210 displays the money amount acceptance screen in FIG. 18 on the sub display part 27 and accepts the choice of the amount of play money (S333). When the transaction control part 210 accepts the amount of play money, the game machine transmitting part 213 transmits the chosen amount of play money to the server 3.

When the identification information receiving part 335 of the server 3 receives the amount of play money, the transaction part 337 refers to the management information and specifies the allowable amount of money corresponding to the received type information out of the allowable amounts of money associated with the previously received ID token. The transaction part 337 determines whether or not the received amount of play money is less than or equal to the specified allowable amount of money (S340).

When the transaction part 337 determines that the amount of play money is less than or equal to the specified allowable amount of money, it transmits the payment instruction for instructing to pay the play money to the game machine 2. When the transaction control part 210 of the game machine 2 receives the payment instruction, it performs payment processing according to the money amount information which indicates the amount of play money. (S350). When the transaction control part 210 completes the payment processing, it transmits the payment request including the money amount information that indicates an amount of money paid and the ID token to the server 3.

When the transaction part 337 of the server 3 receives the payment request, the transaction part 337 specifies the user ID associated with the ID token contained in the payment request and performs the transaction processing to change the balance of electronic money of the user ID (S360).

Next, the transaction part 337 transmits the transaction completion information indicating that the transaction has been finished to the mobile terminal 1 through the game machine 2. When the mobile terminal 1 receives the transaction completion information, it displays on the display part 12 that the transaction has been completed according to the transaction completion information (S370).

When the transaction part 337 determines that the amount of play money is less than or equal to the specified allowable amount of money, it transmits the game start instruction to the game machine 2. When the game machine receiving part 212 of the game machine 2 receives the game start instruction, it performs the game start processing and starts the game with the amount of play money as a maximum (S380).

As described above, according to the present embodiment, because the PIN authentication is performed in the game machine 2 of the transaction system S, the authentication can be performed more securely than in the case where the PIN authentication is performed in the mobile terminal 1.

The Third Exemplary Embodiment

The Mobile Terminal 1 Communicates with the Game Machine 2 Using the NFC

Next, the third exemplary embodiment is explained. In the first exemplary embodiment, the mobile terminal 1 communicates with the game machine 2 corresponding to the received beacon signals. On the other hand, the third exemplary embodiment is different from the first exemplary embodiment in that the mobile terminal 1 communicates with the game machine 2 which established the communication connection by using the NFC whose communication distance is shorter than the BLE, and is the same as the first exemplary embodiment with respect to the other points. Hereinafter, the third exemplary embodiment is explained by referring to figures. The same numerical references as the first exemplary embodiment are used and detailed explanation is appropriately omitted for configurations identical to the first exemplary embodiment.

Figure 26:
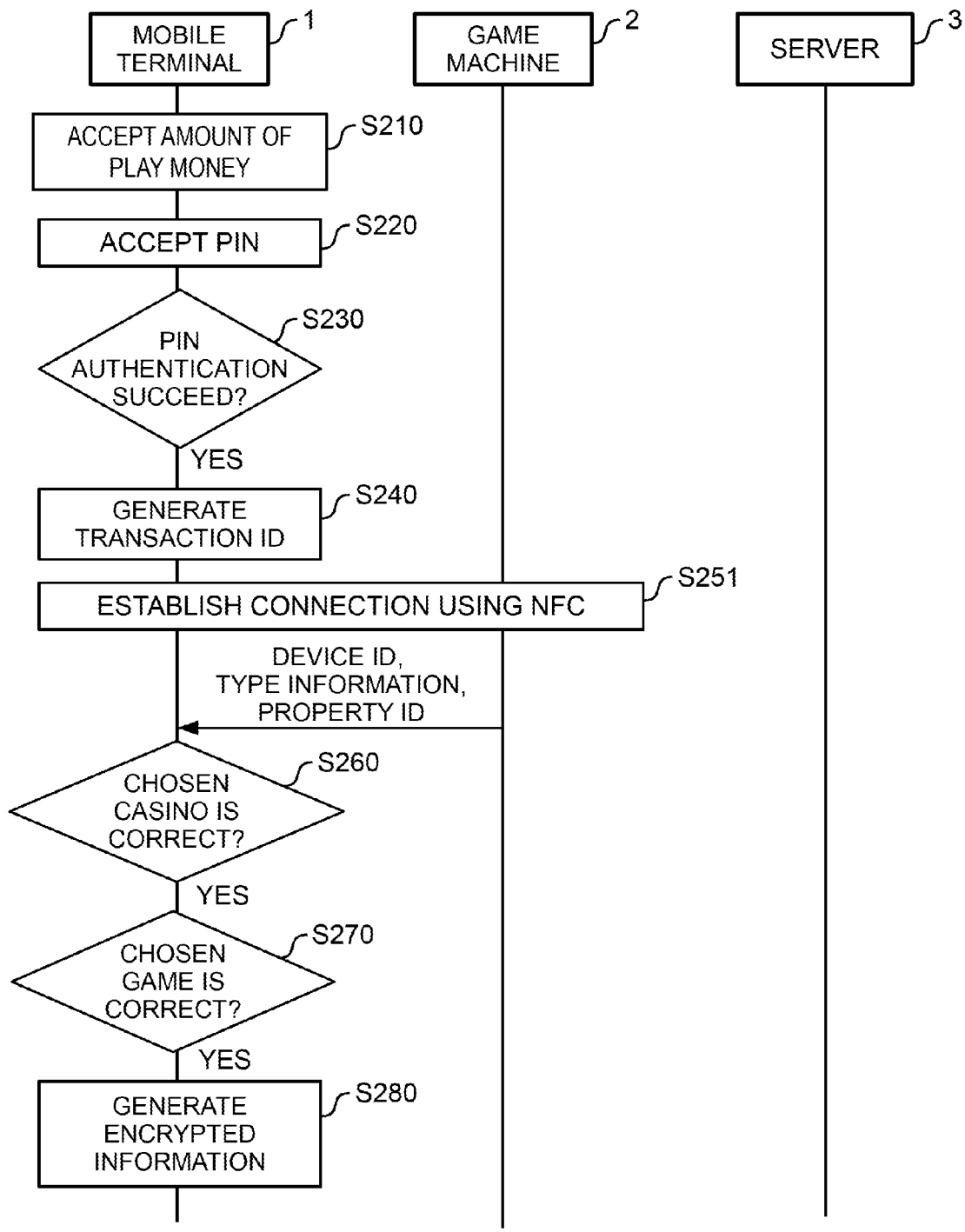
FIG. 26 shows an example of the communication sequence before the mobile terminal generates the encrypted information according to the third exemplary embodiment.

FIG. 26 shows an example of the communication sequence before the mobile terminal 1 generates the encrypted information according to the third exemplary embodiment. The accepting part 164 displays a plurality of choices for the amount of play money corresponding to the user of the mobile terminal 1 on the money amount acceptance screen on the display part 12 like the first exemplary embodiment, and accepts a choice of the amount of play money by the user of the mobile terminal 1 (S210).

When the accepting part 164 acquires the amount of play money, it displays the PIN authentication screen shown in FIG. 10 on the display part 12 and accepts the input of the PIN (S220). When the PIN is inputted, the accepting part 164 performs the PIN authentication and determines whether or not the PIN authentication succeeded (S230). When the accepting part 164 determines that the PIN authentication succeeded, it generates the transaction ID (S240).

When the mobile terminal 1 is brought to a place within a predetermined distance (for example, a few decimeters) from the position of the short distance wireless part 29 after the user of the mobile terminal 1 inputs the PIN, the mobile terminal 1 and the game machine 2 establish the communication connection by using the NFC (S251).

The short distance wireless part 29 of the game machine 2 herein is provided, for example, close to the sub display part 27. The game machine 2 may be provided with a placing part where the mobile terminal 1 can be placed within the predetermined distance from the short distance wireless part 29

After the communication connection using the NFC is established, the game machine transmitting part 213 transmits the device ID, the type information, and the property ID to the mobile terminal 1 through the short distance wireless part 29. When the control part 16 receives the device ID, the type information, and the property ID from the game machine 2 through the short distance wireless part 14, the encrypting part 166 determines whether or not the casino chosen by the user of the mobile terminal 1 is correct (S260).

When the encrypting part 166 determines that the casino indicated by the property ID matches with the casino chosen by the user of the mobile terminal 1, it determines whether or not the type of the game chosen by the user of the mobile terminal 1 is correct (S270). When the encrypting part 166 determines that the type of the game indicated by the type information matches with the type of the game chosen by the user of the mobile terminal 1, it encrypts the ID token stored in the storage part 15 and the amount of play money chosen from the choices for the amount of play money by using the encryption key stored in the storage part 15 and generates the encrypted information (S280).

As described above, according to the present embodiment, the transaction system S can establish the communication connection between the mobile terminal 1 and the game machine 2, and the ID token and the encrypted information can be transmitted from the mobile terminal 1 to the server 3 through the game machine 2 if the user moves the mobile terminal 1 to a position within a predetermined distance from the game machine 2. Therefore, the transaction system S according to the present embodiment can exchange electronic data between the mobile terminal 1 and the game machine 2 with high security and start the game like the first exemplary embodiment.

The Fourth Exemplary Embodiment

The Mobile Terminal 1 Accepts a Choice of the Amount of Play Money from Among Choices for the Play Money Corresponding to the Game Machine 2

Next, the fourth exemplary embodiment is explained. In the first exemplary embodiment, the mobile terminal 1 displays a plurality of choices for the amount of play money corresponding to the user of the mobile terminal 1 and accepts the choice of the amount of play money from the user of the mobile terminal 1. On the other hand, the fourth exemplary embodiment is different from the first embodiment in that the mobile terminal 1 displays a plurality of the choices for the amount of play money corresponding to the game machine 2 and accepts a choice of the amount of play money from the user of the mobile terminal 1, and is the same as the first exemplary embodiment with respect to the other points. Hereinafter, the fourth exemplary embodiment is explained referring to figures.

In the fourth exemplary embodiment, the authentication success information transmitted to the mobile terminal 1 when the server 3 determines that the login authentication succeeded contains button map information as the choice information of the amount of play money. The button map information is information that contains the type information for identifying the type of the game machines 2 and a plurality of the choices for the amount of play money in association with each other, and that contains the choices for the amount of play money corresponding to each of a plurality of pieces of the type information.

Figure 27:
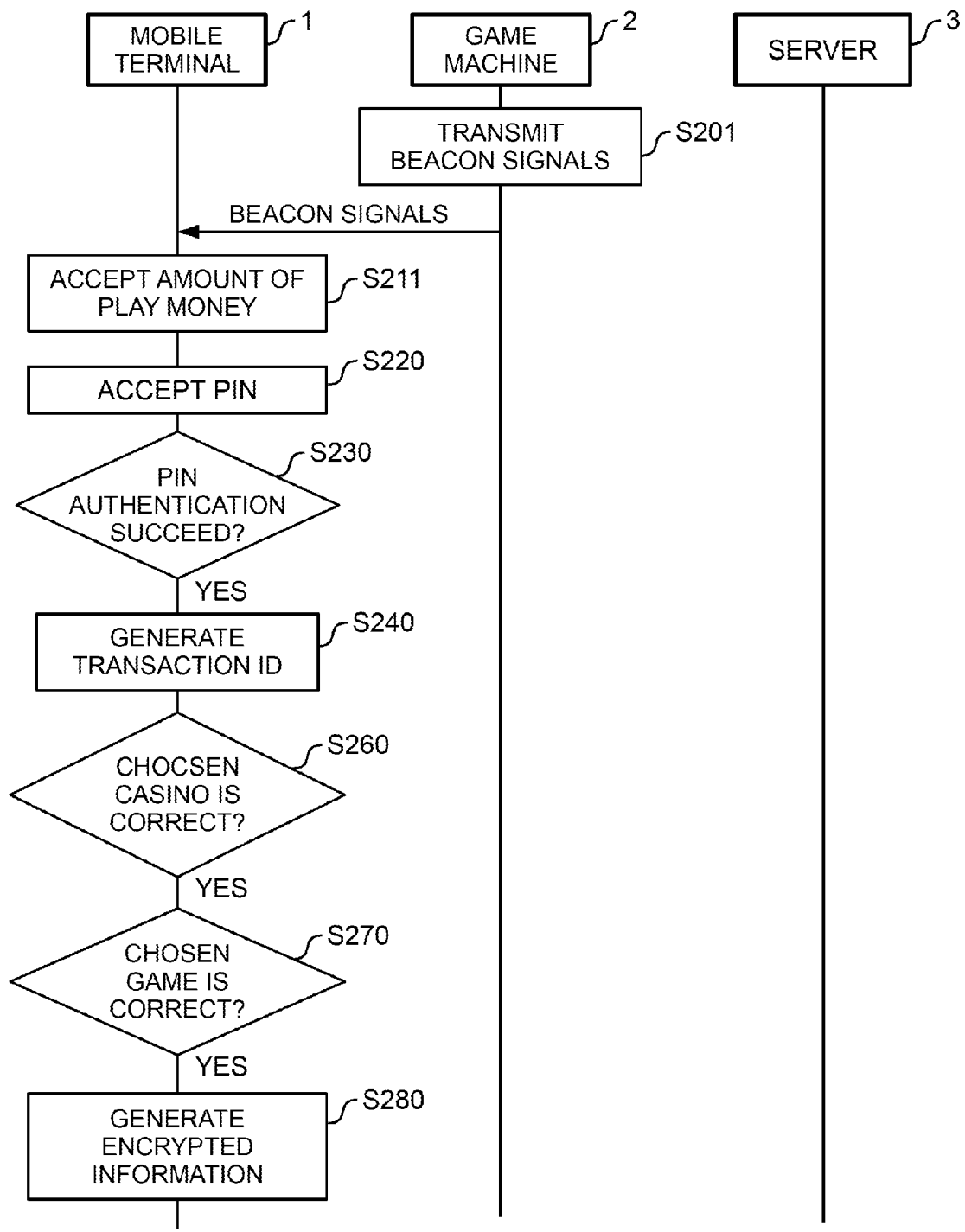
FIG. 27 shows an example of the communication sequence before the mobile terminal generates the encrypted information according to the fourth exemplary embodiment.

FIG. 27 shows an example of the communication sequence before the mobile terminal 1 generates the encrypted information according to the fourth exemplary embodiment. In the fourth exemplary embodiment, the accepting part 164 displays the game choice screen on the display part 12 as shown in FIG. 17 and accepts the choice of a type of the game. When any one of the buttons corresponding to various games displayed on the game choice screen is pressed, the accepting part 164 makes the beacon receiving part 165 start receiving the beacon signals.

The transmission control part 211 of the game machine 2 makes the short distance wireless part 29 periodically transmit the beacon signals (S201). The beacon signals contain the device ID, the type information, the property ID, and the beacon ID.

When the accepting part 164 receives the beacon signals, it chooses the choices for the amount of play money corresponding to the type information contained in the received beacon signals from the previously received button map information. The accepting part 164 displays a plurality of the choices for the amount of play money corresponding to the game machine 2 on the display part 12 and accepts the amount of play money (S211). Although the accepting part 164 displays a plurality of the choices for the amount of play money corresponding to the game machine 2 on the display 12 in the above-mentioned transaction system S, it is not necessarily so limited. For example, the transaction control part 210 may display a plurality of the choices for the amount of play money corresponding to the game machine 2 on the sub display part 27 of the game machine 2 and accept the amount of play money.

The accepting part 164 acquires the amount of play money chosen from a plurality of the choices for the amount of play money displayed on the money amount choice screen as the amount of play money at the game machine 2. When the accepting part 164 acquires the amount of play money, it displays the PIN authentication screen shown in FIG. 10 on the display part 12 and accepts the input of the PIN (S220). When the PIN is inputted, the accepting part 164 performs the PIN authentication and determines whether or not the PIN authentication succeeded (S230). When the accepting part 164 determines that the PIN authentication succeeded, it generates the transaction ID (S240).

Next, the encrypting part 166 determines whether or not the casino chosen by the user of the mobile terminal 1 is correct (S260). Specifically, the encrypting part 166 determines whether or not the casino indicated by the property ID contained in the received beacon signals matches with the casino chosen by the user of the mobile terminal 1 at the casino choice screen shown in FIG. 6.

When the encrypting part 166 determines that the casino indicated by the property ID matches with the casino chosen by the user of the mobile terminal 1, it determines whether or not the type of the game chosen by the user of the mobile terminal 1 is correct (S270). Specifically, the encrypting part 166 determines whether or not the type of the game indicated by the type information contained in the received beacon signals matches with the type of the game chosen by the user of the mobile terminal 1 at the game choice screen shown in FIG. 17.

When the encrypting part 166 determines that the type of the game indicated by the type information matches with the type of the game chosen by the user of the mobile terminal 1, the encrypting part 166 encrypts the ID token stored in the storage part 15 and the amount of play money chosen from the choices for the amount of play money with the encryption key stored in the storage part 15 and generates the encrypted information (S280).

As described above, according to the present embodiment, by using the transaction system S, the user of the mobile terminal 1 can choose the amount of play money from the choices for the amount of play money corresponding to the game machine 2 with which the user is playing. In the present embodiment, a plurality of the choices for the amount of play money corresponding to the game machine 2 are displayed on the display part 12 of the mobile terminal 1 or the sub display part 27 of the game machine 2 but it is not necessarily so limited. For example, the display part 12 or the sub display part 27 may display a plurality of the choices for the amount of play money corresponding to the game machine 2 up to the amount of money indicated by a plurality of the choices for the amount of play money corresponding to the user of the mobile terminal 1.

The present disclosure is described with the exemplary embodiments but the technical scope of the present disclosure is not limited to the scope described in the above embodiment. It is apparent for those skilled in the art that it is possible to make various changes and modifications to the embodiment. It is apparent from the description of the scope of the claims that the forms added with such changes and modifications are included in the technical scope of the present disclosure.

For example, in the first exemplary embodiment, the mobile terminal 1 performs the PIN authentication immediately after accepting the amount of play money, but it may perform the PIN authentication after the mobile terminal 1 receives the beacon signals and determine that the type of the game is correct.

Further, in the first exemplary embodiment, the encrypted information is generated by encrypting the ID token, and it is determined whether or not the mobile terminal 1 that transmitted the encryption key is a correct terminal according to whether or not the ID token acquired by decoding the encrypted information matches with the ID token received in an unencrypted manner, but it is not necessarily so limited. If specific information acquired by decoding encrypted information matches with other specific information received in an unencrypted manner in the server 3, the information may be any information, and it may be, for example, the beacon ID.

What is claimed is:

1. A method of starting a game at a game machine of an arcade that comprises a mobile terminal, the game machine capable of performing short distance wireless communication with the mobile terminal, and a server capable of performing communication with the mobile terminal and the game machine, the method comprising:
   transmitting a user's login information from the mobile terminal to the server;
   transmitting an encryption key or encryption key information for specifying the encryption key and an unencrypted ID token for identifying the user of the mobile terminal from the server to mobile terminal after authentication based on the user's login information succeeds in the server;
   transmitting a plurality of beacon signals from the game machine using short distance wireless communication, wherein each beacon signal contains game machine identification information and beacon identification information that is changed at a predetermined timing;
   acquiring an amount of play money used to play at the game machine from the mobile terminal;
   generating encrypted information by encrypting the unencrypted ID token and the amount of play money with the received encryption key or the encryption key corresponding to the received encryption key information in the mobile terminal;
   transmitting the beacon identification information contained in the beacon signal corresponding to the beacon signal whose intensity of a received radio wave is the highest within a predetermined period from among the beacon signals whose intensity of received radio waves is higher than a predetermined intensity, the unencrypted ID token, and the encrypted information from the mobile terminal to the game machine;
   transmitting the unencrypted ID token and the encrypted information transmitted by the mobile terminal from the game machine to the server when the beacon identification information that the game machine received from the mobile terminal matches beacon identification information that the game machine transmitted;
   decoding the encrypted information on the server; and
   the server authorizing the game machine to start play up to the amount of the play money based on the user's ID token and the amount of the play money when the unencrypted ID token received by the server matches a decrypted ID token obtained by decoding the encrypted information in the server.

2. The method of claim 1, wherein the decoding includes:
   specifying the encryption key associated with user identification information associated with the user's login information transmitted to the server by referring to a storage part storing encryption keys and a plurality of pieces of user identification information in association with each other, and
   decoding the encrypted information with the specified encryption key.

3. The method of claim 1, wherein authorizing the game machine to start play includes transacting a payment based on user identification information associated with the user's login information and the amount of play money when the unencrypted ID token received by the server matches the decrypted ID token acquired by the decoding, and when the amount of play money is less than or equal to an allowable amount of money of the user previously stored in a storage part in association with the user identification information.

4. The method of claim 1, further comprising:
   determining whether or not the game machine and the mobile terminal can be connected with each other based on information contained in the plurality of beacon signals when the mobile terminal receives the plurality of beacon signals from the game machine; and
   establishing a communication connection between the mobile terminal and the game machine that transmitted the plurality of beacon signals,
   wherein transmitting the unencrypted ID token and the encrypted information includes transmitting the unencrypted ID token and the encrypted information to the server through the game machine that establishes the communication connection with the mobile terminal.

5. The method of claim 1, wherein transmitting the unencrypted ID token and the encrypted information includes transmitting the unencrypted ID token and the encrypted information to the server after the game machine transmits the plurality of beacon signals and before the game machine transmits another beacon signal with changed beacon identification information.

6. The method of claim 1, wherein transmitting the plurality of beacon signals includes transmitting the plurality of beacon signals from the game machine when the game machine detects a predetermined operation.

7. The method of claim 1, wherein acquiring the amount of play money used to play at the game machine includes:
accepting a choice of a type of the game, and
accepting the amount of play money corresponding to the chosen type of the game,
wherein transmitting the plurality of beacon signals includes transmitting the beacon signal containing type information for identifying the type of the game corresponding to the game machine from the game machine, and
wherein generating encrypted information further includes displaying error information on a display part of the mobile terminal when the type of the game indicated by the type information contained in the beacon signal differs from a chosen type of the game in the mobile terminal which received the beacon signal.

8. The method of claim 1, wherein acquiring the amount of play money includes:
accepting a choice of the arcade where the game machine is installed, and
accepting the amount of play money corresponding to the games played in the chosen arcade,
wherein transmitting the plurality of beacon signals includes transmitting the beacon signals containing arcade identification information for identifying the arcade from the game machine, and
wherein generating encrypted information further includes displaying error information on a display part of the mobile terminal when an arcade indicated by the arcade identification information contained in the beacon signal differs from a chosen arcade in the mobile terminal which received the beacon signal.

9. The method of claim 1, further comprising:
transmitting a first request for requiring acquisition of a new encryption key to the server when a first period has passed after the mobile terminal receives the encryption key; and
transmitting the new encryption key to the mobile terminal from the server when the server receives the first request.

10. The method of claim 1, wherein transmitting the encryption key includes:
generating user identification information in association with master identification information for permanently identifying the user of the mobile terminal when authentication based on the user's login information succeeds in the server, and transmitting the encryption key and the generated user identification information to the mobile terminal from the server.

11. The method of claim 10, further comprising:
transmitting a second request for requiring acquisition of new user identification information to the server when a second period has passed after the mobile terminal receives the user identification information; and
generating new user identification information in association with the master identification information and transmitting the new user identification information from the server to the mobile terminal when the server receives the second request.

12. The method of claim 1, wherein acquiring the amount of play money includes:
displaying a plurality of choices for an amount of play money corresponding to the user of the mobile terminal on a display part of the mobile terminal or a display part of the game machine, and
acquiring the amount of play money chosen from the plurality of the choices for the amount of play money as the amount of play money at the game machine.

13. The method of claim 12, further comprising:
acquiring the plurality of choices for the amount of play money corresponding to the user of the mobile terminal from the server in the mobile terminal or in the game machine.

14. The method of claim 1, wherein acquiring the amount of play money includes:
displaying a plurality of choices for an amount of play money corresponding to the game machine on a display part of the mobile terminal or a display part of the game machine, and
acquiring the amount of play money chosen from the plurality of choices for the amount of play money as the amount of play money at the game machine.

15. The method of claim 14, further comprising:
acquiring the plurality of choices for the amount of play money corresponding to the game machine from the server in the mobile terminal or in the game machine.

16. The method of claim 1, further comprising:
holding the ID token in the game machine or the server until (i) the game ends, (ii) an operation of ending the game is accepted by the mobile terminal or the game machine, (iii) the encrypted information from another mobile terminal different from the mobile terminal is received, or (iv) the amount of play money is acquired through a means other than the mobile terminal after the game has started.

17. The method of claim 16, further comprising:
refunding remaining money to the user corresponding to the ID token when any of the play money in the game machine remains and when an operation to end the game is received.

18. The method of claim 17, wherein refunding includes refunding only the amount of the play money that can be converted into cash, out of the remaining play money, to the user.

19. The method of claim 16, wherein holding includes:
transmitting user confirmation beacon signals containing the ID token for periodically confirming the user from the game machine to the mobile terminal when the ID token is held,
transmitting response information to the game machine when the mobile terminal receives the user confirmation beacon signals, and
halting specification of the user based on the ID token when the game machine cannot consecutively receive the response information a predetermined number of times after the game machine transmits the user confirmation beacon signals to the mobile terminal.

20. The method of claim 1, further comprising:
acquiring a refund instruction for refunding money remaining in the game machine after the game ends;
transmitting an encryption key or encryption key information for specifying the encryption key from the server to the mobile terminal after the refund instruction is acquired;
generating second encrypted information by encrypting second predetermined information with the received encryption key or the encryption key corresponding to the received encryption key information;
transmitting the second predetermined information and the second encrypted information to the server through the game machine;
decoding the second encrypted information; and refunding money remaining in the game machine after the game ends to the user corresponding to the user identification information when the second predetermined information received by the server matches with the second predetermined information acquired by the decoding in the server.

21. A system including a mobile terminal, a game machine capable of performing short distance wireless communication with the mobile terminal, and a server capable of performing communication with the mobile terminal and the game machine, wherein, the mobile terminal includes:
    a login information transmitting part configured to transmit a user's login information to the server,
    an encryption key receiving part configured to receive an encryption key or encryption key information that specifies the encryption key and an unencrypted ID token for identifying the user of the mobile terminal from the server,
    an accepting part configured to accept an amount of play money,
    a beacon receiving part configured to receive a plurality of beacon signals transmitted from the game machine,
    an encrypting part configured to generate encrypted information by encrypting the unencrypted ID token and the amount of play money with the received encryption key or the encryption key corresponding to the received encryption key information, and
    an identification information transmitting part configured to transmit beacon identification information contained in the beacon signal corresponding to the beacon signal whose intensity of a received radio wave is the highest within a predetermined period from among the beacon signals whose intensity of received radio waves is higher than a predetermined intensity, the unencrypted ID token, and the encrypted information to the game machine, the game machine includes:
    a transmission control part configured to transmit the plurality of beacon signals from the game machine using short distance wireless communication, wherein each beacon signal contains game machine identification information and beacon identification information that is changed at a predetermined timing, and
    a receiving part configured to receive beacon identification information, unencrypted ID token, and encrypted information from the mobile terminal, and
    a transmitting part configured to transmit the encrypted information and the unencrypted ID token received from the mobile terminal to the server when beacon identification information that the game machine received from the mobile terminal matches beacon identification information that the game machine transmitted, and the server includes:
    an encryption key transmitting part configured to transmit the encryption key or the encryption key information and the unencrypted ID token for identifying the user of the mobile terminal to the mobile terminal after authentication based on the user's login information received from the mobile terminal succeeds,
    a decoding part configured to decode the received encrypted information, and
    a transaction part configured to authorize the game machine to start play up to the amount of the play money based on the user's ID token and the amount of play money when the unencrypted ID token received by the server matches a decrypted ID token obtained by decoding the encrypted information.

* * * * *